(12) United States Patent
Gupta et al.

(10) Patent No.: US 11,601,500 B2
(45) Date of Patent: Mar. 7, 2023

(54) METHOD AND DEVICE FOR STORING A DATA FILE IN A CLOUD-BASED STORAGE

(71) Applicant: Samsung Electronics Co., Ltd., Suwon-si (KR)

(72) Inventors: Vipul Gupta, Haryana (IN); Ankur Agrawal, Uttar Pradesh (IN); Rahul Agrawal, Madhya Pradesh (IN); Prashant Sharma, Uttar Pradesh (IN); Anil Kumar Saini, Uttar Pradesh (IN); Kalgesh Singh, New Delhi (IN); Saurabh Kumar, Patna (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/823,178

(22) Filed: Mar. 18, 2020

(65) Prior Publication Data
US 2020/0304574 A1 Sep. 24, 2020

(30) Foreign Application Priority Data

Mar. 18, 2019 (IN) .............................. 201911010510
Jul. 23, 2019 (IN) .............................. 201911010510

(51) Int. Cl.
*H04L 67/1097* (2022.01)
*G06F 3/06* (2006.01)

(52) U.S. Cl.
CPC ........ *H04L 67/1097* (2013.01); *G06F 3/0604* (2013.01); *G06F 3/067* (2013.01); *G06F 3/0641* (2013.01)

(58) Field of Classification Search
CPC ... G06F 16/178; G06F 3/0604; H04L 67/1097
See application file for complete search history.

(56) References Cited

U.S. PATENT DOCUMENTS 8,606,923 B2 12/2013 Tekwani
9,348,840 B2 5/2016 Sedayao et al.
(Continued)

FOREIGN PATENT DOCUMENTS

CN 109670116 A 4/2019
JP 5392808 B2 1/2014
(Continued)

OTHER PUBLICATIONS

"Best Tool to Sync Filed between Multiple Cloud Storage Services", www.securedatarecovery.com, Jun. 13, 2017, 5 pages.
(Continued)

*Primary Examiner* — Mahran Y Abu Roumi

(57) ABSTRACT

A method of storing or searching data files on a plurality of cloud-based storage systems includes detecting an event on the electronic device indicative of storing at least one data file on a cloud-based storage, analyzing the at least one data file in response to detecting the event to extract a plurality of elements, mapping the plurality of elements to one or more rules stored in a memory of the electronic device, selecting at least one cloud-based storage for storing the at least one data file, and storing information corresponding to the at least one data file in the memory upon storing the at least one data file onto the selected at least one cloud-based storage for searching the at least one data file.

11 Claims, 23 Drawing Sheets

(56) References Cited

U.S. PATENT DOCUMENTS

| | | | |
|---|---|---|---|
| 9,396,209 | B2 | 7/2016 | Fukui et al. |
| 9,565,253 | B2 | 2/2017 | de Sene et al. |
| 2010/0333116 | A1 | 12/2010 | Prahlad et al. |
| 2012/0150925 | A1 | 6/2012 | Gupta et al. |
| 2013/0027365 | A1* | 1/2013 | Sugimoto ............ H04N 1/0048 345/204 |
| 2013/0254026 | A1 | 9/2013 | Hadatsuki et al. |
| 2013/0305039 | A1* | 11/2013 | Gauda ................. G06F 21/6218 713/153 |
| 2013/0339175 | A1* | 12/2013 | Suciu .................. H04M 15/805 705/26.4 |
| 2014/0006350 | A1* | 1/2014 | Fukui .................... G06F 16/178 707/632 |
| 2014/0172929 | A1* | 6/2014 | Sedayao ............... G06F 16/184 707/827 |
| 2014/0310455 | A1 | 10/2014 | Baldwin et al. |
| 2017/0237812 | A1 | 8/2017 | Sutardja |
| 2017/0262443 | A1 | 9/2017 | Cho et al. |
| 2018/0191732 | A1* | 7/2018 | Erciyes ................. H04L 63/107 |
| 2019/0182322 | A1* | 6/2019 | Kumar .................. G06F 3/0638 |

FOREIGN PATENT DOCUMENTS

| | | |
|---|---|---|
| JP | 6111773 B2 | 3/2017 |
| KR | 10-2018-0128147 A | 12/2018 |
| WO | 2014171850 A1 | 10/2014 |
| WO | 2016106087 A1 | 6/2016 |

OTHER PUBLICATIONS

"Multi-Cloud Won't Work Without Replication; How Do We Get There?", www.datacenterknowledge.com, Feb. 21, 2017, 7 pages.

International Search Report and Written Opinion of the International Searching Authority in connection with International Application No. PCT/KR2020/003690 dated Jun. 26, 2020, 10 pages.

Supplementary Partial European Search Report dated Dec. 8, 2021, in connection with European Application No. 20772794.2, 14 pages.

European Patent Office, "Supplementary European Search Report", dated Apr. 4, 2022, in connection with European Patent Application No. 20772794.2, 17 pages.

\* cited by examiner

FIG. 12B

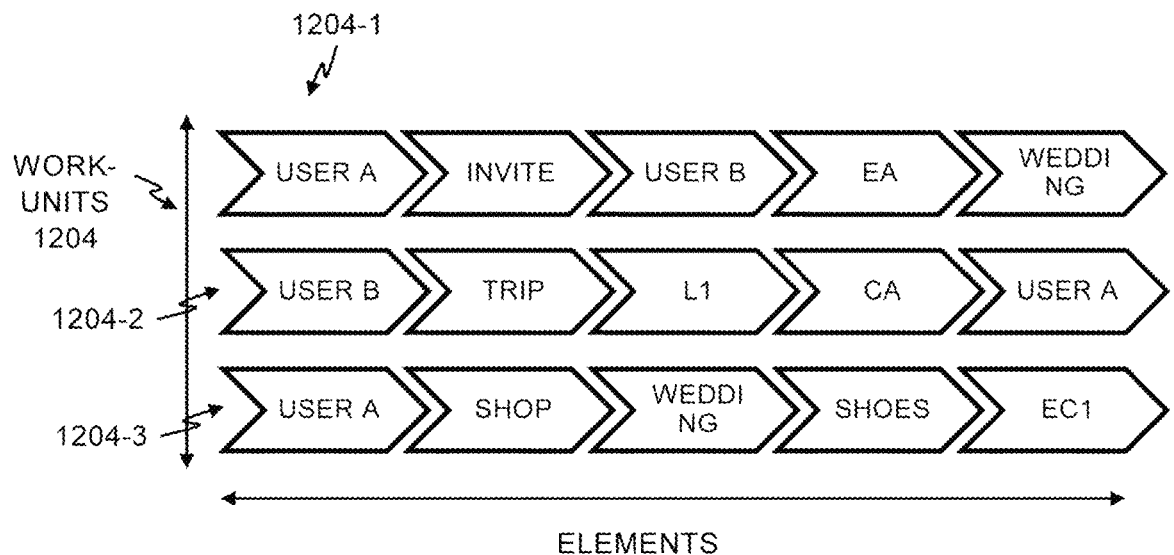

Work Units
- Work Unit1 : Element 1 , Element 7 , Element 3 , Element 1 (C3)
- Work Unit2 : Element 4 , Element 2 , Element 3 , Element 12 (C3)
- Work Unit112 : Element 6 , Element 2 , Element 3 , Element 22 (C2)
- Work Unit3 : Element 3 , Element 2 , Element 5 (C1)
- Work Unit15 : Element 10 , Element 12 , Element 3 , Element 10 (C1)
- Work Unit12 : Element 1 , Element 2 , Element 3 , Element 9 (C3)
- Work Unit19 : Element 32 , Element 2 , Element 7 , Element 2 (C2)
- Work Unit23 : Element 9 , Element 0 , Element 3 , Element 19 (C2)
- Work Unit5 : Element 9 , Element 0 , Element 3 , Element 10 (C3)
- Work Unit8 : Element 19 , Element 2 , Element 4 , Element 5 (C1)
- Work Unit9 : Element 4 , Element 2 , Element 3 , Element 28 (C1)

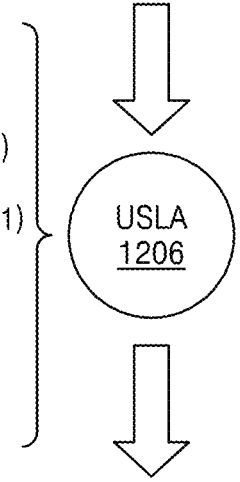

USLA
1206

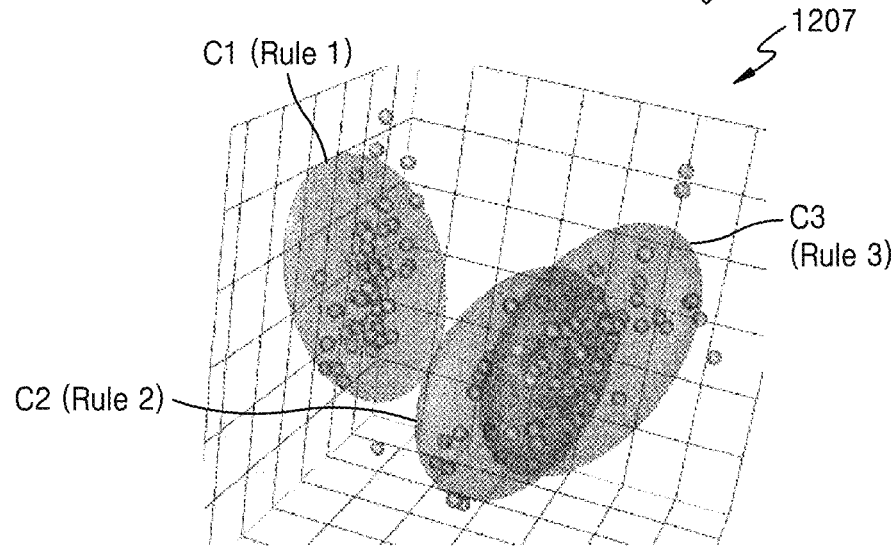

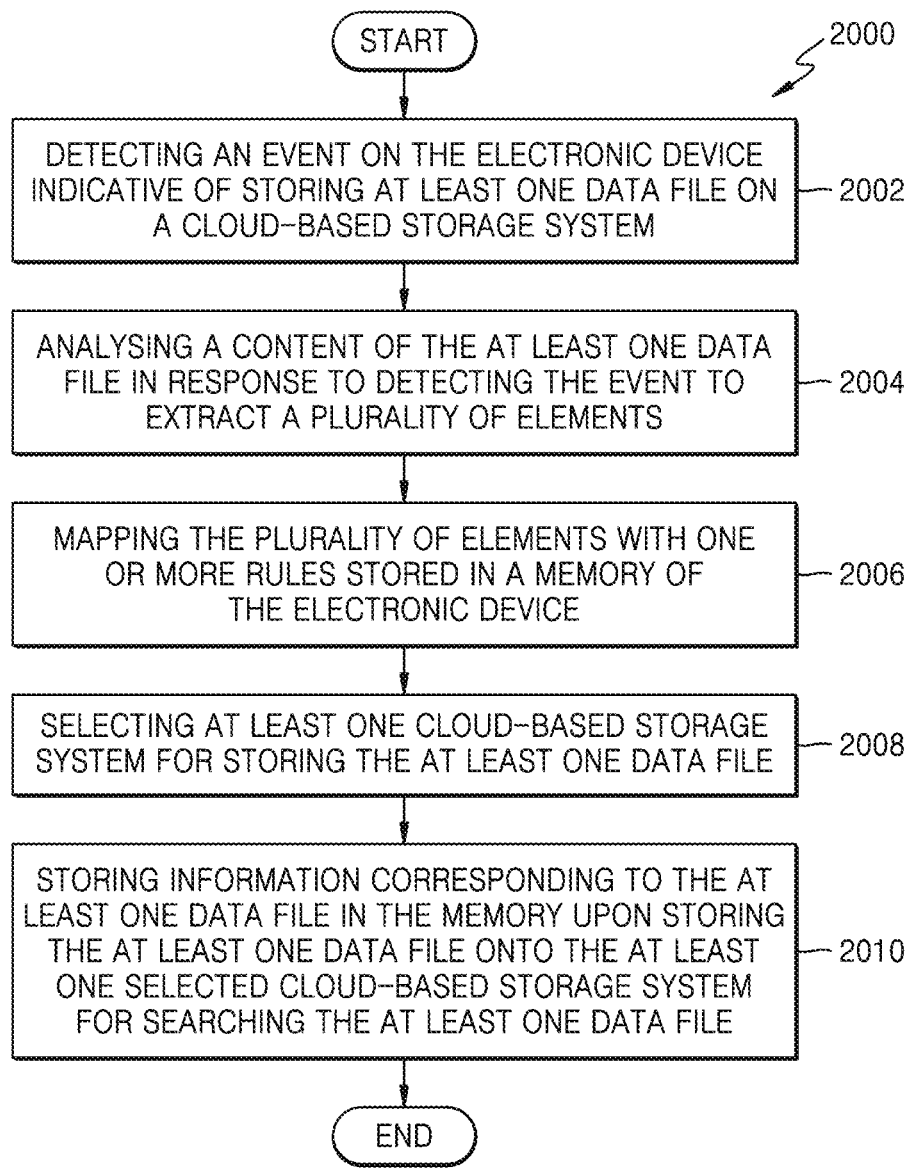

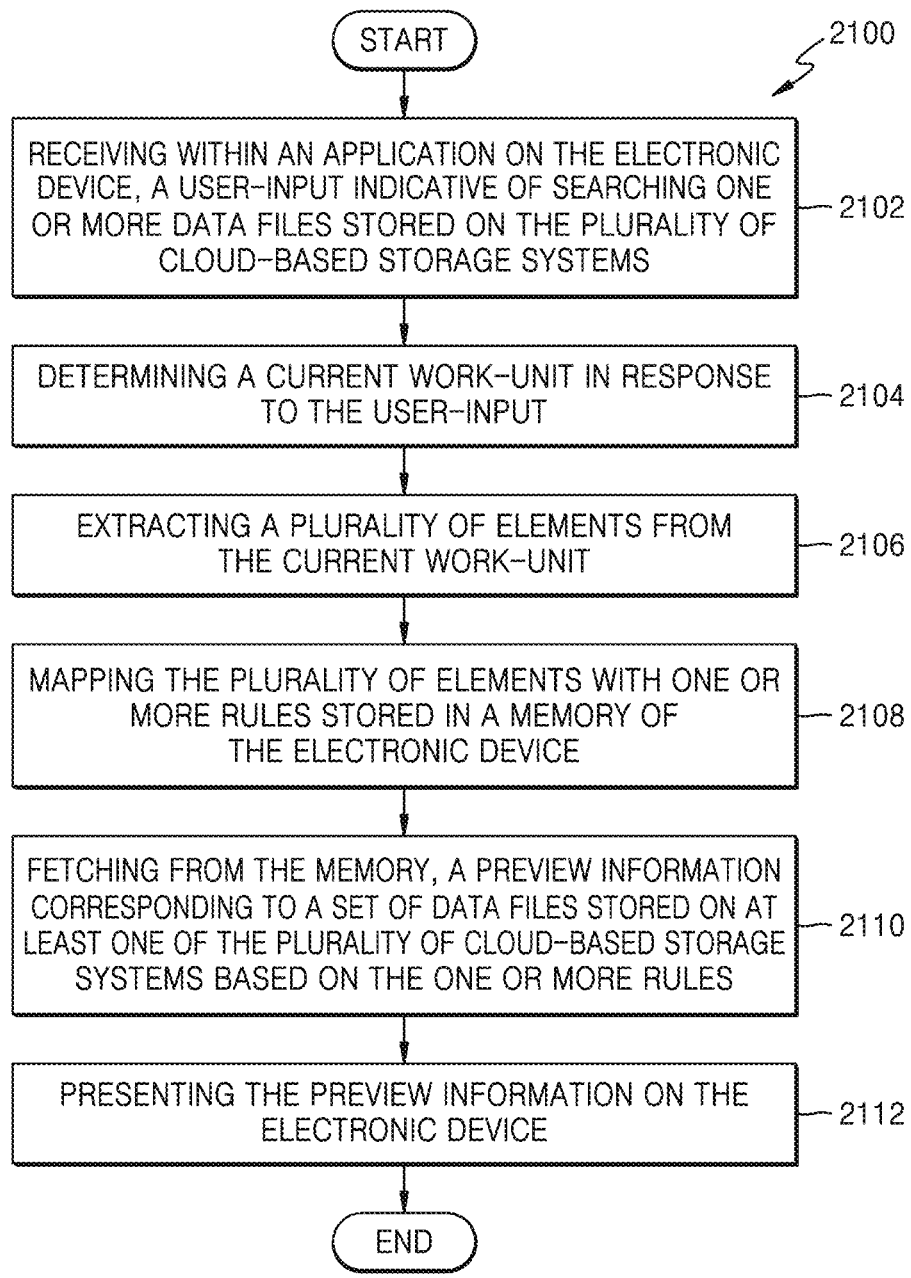

METHOD AND DEVICE FOR STORING A DATA FILE IN A CLOUD-BASED STORAGE

CROSS-REFERENCE TO RELATED APPLICATIONS

This application is based on and claims priority under 35 U.S.C. § 119(a) to Indian Patent Application No. 201911010510 (PS) filed on Mar. 18, 2019, and Indian Patent Application No. 201911010510 (CS) filed on Jul. 23, 2019 in the Indian Intellectual Property Office, the disclosures of which are herein incorporated by reference in their entirety.

BACKGROUND

1. Field

The disclosure generally relates to cloud based storage systems which provide services and storage over the Internet or cloud. More particularly, the disclosure relates to storing and searching of data on the cloud-based storage systems.

2. Description of Related Art

With the advent of technology, mobile devices such as smartphones, notebooks, laptops, etc., require secondary storage space to satisfy growing needs of users, especially in relation to multimedia contents. Such secondary storage space provides memory space with terabytes (TBs). Contents created by or for users have increased multiple folds and the growth of content is exponential. Consequently, popularity of cloud-based storage services has increased tremendously. The cloud-based storage is a computer data storage in which the digital data is stored in logical pools via a wired or a wireless network. The cloud-based storage services may be accessed from an electronic device through a collocated computing service, a web service application programming interface (API) or by applications that utilize the API. The cloud-based storage services allow users to store their content on cloud-based storage systems provided by storage service provider over Internet or cloud, to synchronize content across devices such as mobile device, desktop, smart device, etc., and to share files. With the introduction of machine learning, cloud-based storage systems have become efficient from just being a backup destination or a medium to share large files to work efficiently as a secondary storage to every device of the user.

Typically, a user has to create an account with each of the cloud-based storage services to access the cloud-based storage systems. However, all such accounts for storing the content of user lead to multiple copies of same content on different cloud-based storage systems. This in turn leads to wastage of storage space and inefficient data storage & management in the cloud-based storage systems. In addition, lot of manual input is required to access relevant content, which may be stored in any or all of the cloud-based storage systems. This further deteriorates user experience as the data is not easily searchable. Further, cloud-based storage systems are mostly used as backup-only storage of data when storage space in devices becomes low. This leads to wastage of storage space and resources of the devices. Thus, it would be desirable to provide a solution to overcome the above mentioned deficiencies.

SUMMARY

This summary is provided to introduce a selection of concepts in a simplified format that are further described in the detailed description of the disclosure. This summary is not intended to identify key or essential inventive concepts of the disclosure, nor is it intended for determining the scope of the disclosure. In accordance with the purposes of the disclosure, the disclosure as embodied and broadly described herein, describes methods and electronic devices for storing and searching of data files on cloud-based storage systems configured to be in communication with such electronic devices.

In accordance with one or more embodiments of the disclosure, a method of storing data files on at least one cloud-based storage system configured to be in communication with an electronic device is disclosed. The method includes detecting an event on the electronic device indicative of storing at least one data file on cloud-based storage, analyzing the at least one data file in response to detecting the event to extract a plurality of elements, mapping the plurality of elements with one or more rules stored in a memory of the electronic device, selecting, among a plurality of cloud-based storages, at least one cloud-based storage for storing the at least one data file, and storing information corresponding to the at least one data file in the memory upon storing the at least one data file onto the selected at least one cloud-based storage system for searching the at least one data file.

In accordance with one or more embodiments of the disclosure, an electronic device to store data files on at least one cloud-based storage system configured to be in communication with the electronic device is disclosed. The electronic device includes a memory and a processor coupled to the memory and configured to execute computer readable instructions to detect an event on the electronic device indicative of storing at least one data file on the plurality of cloud-based storage systems. The processor is configured to analyze the at least one data file in response to the detection of the event to extract a plurality of elements, to map the plurality of elements with one or more rules stored in the memory, and to select, among a plurality of cloud-based storages, at least one cloud-based storage system for storing the at least one data file. The processor is further configured to store information corresponding to the at least one data file in the memory upon storing the at least one data file onto the selected at least one cloud-based storage system for searching the at least one data file.

In accordance with one or more embodiments of the disclosure, a method of searching data files stored in a plurality of cloud-based storage systems configured to be in communication with an electronic device is disclosed. The method includes receiving within an application on the electronic device, a user-input indicative of searching one or more data files stored on the plurality of cloud-based storages. The method includes determining a current work-unit in response to the user-input. The method includes extracting a plurality of elements from the current work-unit. The method includes mapping the plurality of elements with one or more rules stored in a memory of the electronic device. The method includes fetching from the memory, preview information corresponding to a set of data files stored on at least one of the plurality of cloud-based storage systems based on the one or more rules. The method includes presenting the preview information on the electronic device.

In accordance with one or more embodiments of the disclosure, an electronic device to searching data files stored in a plurality of cloud-based storage systems configured to be in communication with the electronic device is disclosed. The electronic device comprises a memory and a processor coupled to the memory and configured to execute computer readable instructions to receive, within an application on the electronic device, a user-input indicative of searching one or more data files stored on the plurality of cloud-based storages. The processor is to determine a current work-unit in response to the user-input and to extract a plurality of elements from the current work-unit. The processor is to map the plurality of elements with one or more rules stored in the memory. The processor is to then fetch, from the memory, preview information corresponding to a set of data files stored on at least one of the plurality of cloud-based storages based on the one or more rules and to present the preview information on the electronic device.

Some of the advantages of the disclosure include, but not limited to, enabling uploading of files onto cloud-based storage systems and managing of the uploaded files onto the cloud-based storage systems in accordance with the user preferences and predicted usage relevance using machine learnt pattern of user's usage. Further, data files are available to a user based on relevance and prediction of the file's requirement in current situation. This leads to syncing of data files on the cloud storage systems. In addition, the user is aware of type of data files stored in each of the cloud storage systems. This leads to elimination of searching of data files cloud storage systems on all of cloud storage systems. This further leads to enhanced user experience.

These aspects and advantages will be more clearly understood from the following detailed description taken in conjunction with the accompanying drawings.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 12A-12C illustrate example data flows for storing and searching data files on the plurality of cloud-based storage systems, according to an embodiment of the disclosure;

FIG. 20 illustrates a flow diagram of a method 2000 for storing data files on at least one cloud-based storage system, according to an embodiment of the disclosure; and FIG. 21 illustrates a flow diagram of searching data files on the plurality of cloud-based storage systems, according to an embodiment of the disclosure.

Figure 1:
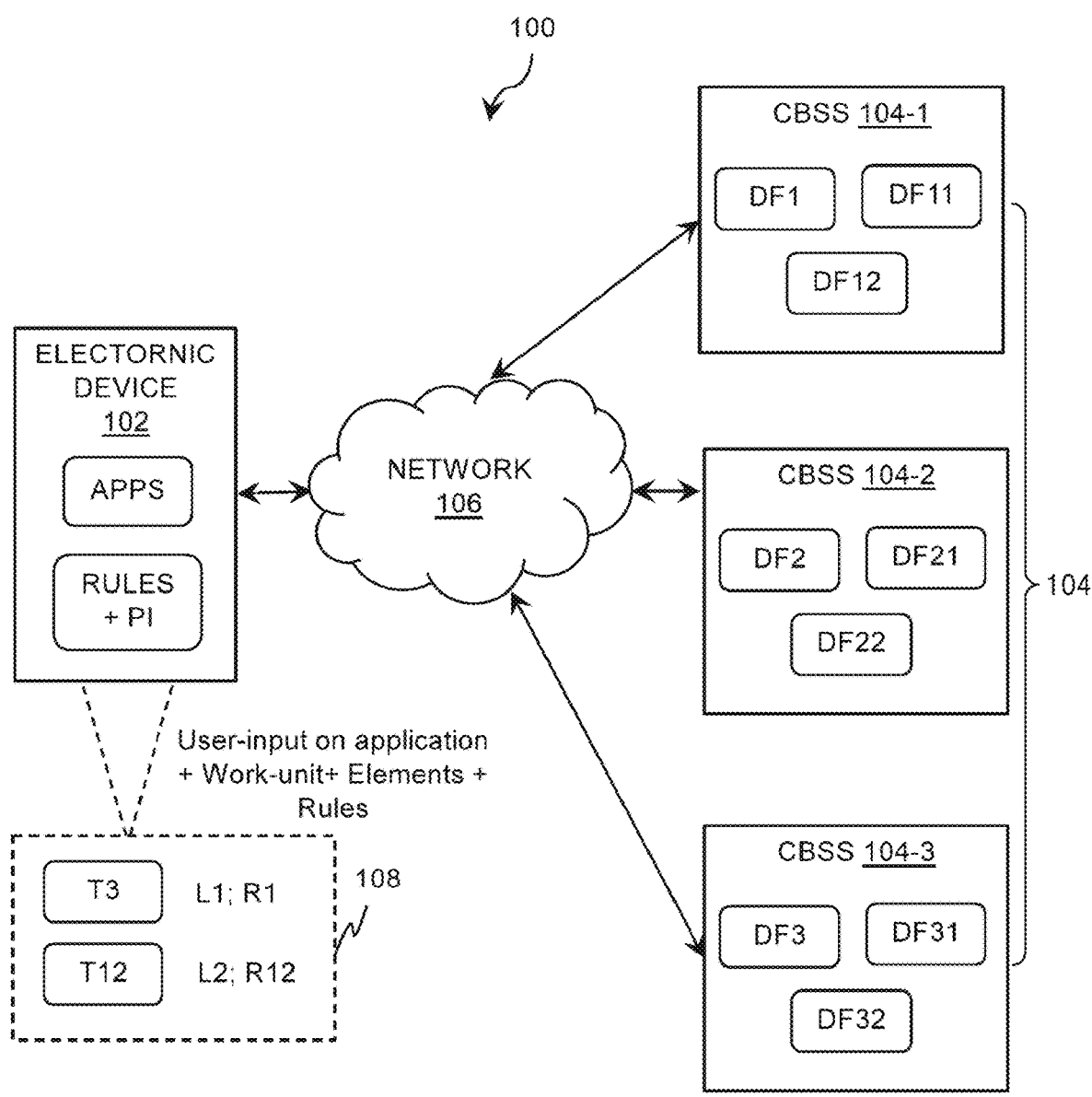
FIG. 1 illustrates example network environment depicting interaction between plurality of cloud-based storage systems and electronic device for storing and searching of data files on the plurality of cloud-based storage systems, in accordance with embodiments of the disclosure.

Further, skilled artisans will appreciate that elements in the drawings are illustrated for simplicity and may not have been necessarily been drawn to scale. For example, the flow charts illustrate the method in terms of some operations involved to help to improve understanding of aspects of the disclosure. Furthermore, in terms of the construction of the device, one or more components of the device may have been represented in the drawings by conventional symbols, and the drawings may show some specific details that are pertinent to understanding some example embodiments of the disclosure so as not to obscure the drawings with details that will be readily apparent to those of ordinary skill in the art having benefit of the description herein.

DETAILED DESCRIPTION

FIGS. 1 through 21, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

It will be understood by those skilled in the art that the foregoing general description and the following detailed description are explanatory of the disclosure and are not intended to be restrictive thereof.

The following description with reference to the accompanying drawings is provided to assist in a comprehensive understanding of various embodiments of the disclosure as defined by the claims and their equivalents. It includes various specific details to assist in that understanding but these are to be regarded as merely examples. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the terms "1st" or "first" and "2nd" or "second" may use corresponding components regardless of importance or order and are used to distinguish one component from another without limiting the components.

Reference throughout this specification to "an aspect", "another aspect" or similar language means that a particular feature, structure, or characteristic described in connection with the embodiment is included in at least one embodiment of the disclosure. Thus, appearances of the phrase "in an embodiment", "in another embodiment" and similar language throughout this description may, but do not necessarily, all refer to the same embodiment.

Unless otherwise defined, all technical and scientific terms used herein have the same meaning as commonly understood by one of ordinary skill in the art to which this disclosure belongs. The system, methods, and examples provided herein are illustrative only and not intended to be limiting.

The disclosure provides efficient data storage management by enabling storage of data files on user selected cloud-based storage systems and an easy access to data files from the cloud-based storage systems.

FIG. 1 illustrates a network environment 100 depicting interaction between an electronic device 102 and a plurality of cloud-based storage systems 104. The electronic device 102 and the plurality of cloud-based storage systems (hereinafter interchangeably referred to as 'CBSS') 104 are communicating with each other over a network 106. For the sake of brevity, only three cloud-based storage systems have been illustrated as CBSS 104-1, CBSS 104-2, and CBSS 104-3. The network 106 may be a wireless network such as Internet. Examples of the electronic device 102 include, but not limited to, a mobile device, a smart phone, a laptop computer, a notebook computer, and a personal digital assistance (PDA), a desktop computer, a wearable device, smart TV, etc. The electronic device 102 includes a plurality of applications (APPS) for providing various services to a user of the electronic device 102. Examples of the applications include, but not limited to, social media applications, gallery application, contact application, chat application, calendar application, document application (e.g., word, excel, power point), etc.

The cloud-based storage systems 104 store data files (represent as DF-n, n being a numeral) as received from the electronic device 102 over the network 106 and synchronize the data files across multiple electronic devices including the electronic device 102 and additional electronic devices. Examples of data files include, but not limited to, images, videos, audios, animations, documents, and computer readable data in any format capable of being displayed on the electronic device 102 and shared via the applications. It would be understood, the user of the electronic device 102 creates an account with corresponding cloud-based storage service provider to be able to store data files on the plurality of cloud-based storage systems 104. The plurality of cloud-based storage systems 104 may be accessed by the electronic device 102 either directly through their corresponding weblinks or applications or via other applications.

In an embodiment, the electronic device 102 detects an event indicative of storing at least one data file on a cloud-based storage system. The electronic device 102 analyzes the at least one data file in response to detecting the event from a task to extract a plurality of elements. The elements are breakup of a task into smallest meaningful units. The analyzing of the at least one data file may be performed by analyzing content of the at least one data file. The electronic device 102 maps the plurality of elements with one or more rules (RULES) stored in a memory. The one or more rules are predetermined weightage based associations between the plurality of elements. The electronic device 102 selects at least one cloud-based storage system 104 for storing the at least one data file based on user-preference data stored in the memory. The electronic device 102 stores information corresponding to the at least one data file upon storing the at least one data file onto the at least one selected cloud-based storage system 104 for searching the at least one data file. The information includes preview information (PI) corresponding to the at least one data file and the one or more rules.

In an embodiment, the electronic device 102 receives, within the application, a user input indicative of searching for one or more data files stored on the plurality of cloud-based storage systems 104. The electronic device 102 derives current work-unit in response to the user input. The electronic device 102 extracts a plurality of elements from the current work-unit. The electronic device 102 maps the plurality of elements with one or more rules (RULES) stored in the memory. The one or more rules are predetermined maximum weightage based associations between the plurality of elements. The electronic device 102 fetches, from the memory, preview information 108 corresponding to a set of data files stored on at least one of the plurality of cloud-based storage systems based on the one or more rules. The preview information comprises mapping between data identity associated to the at least one data and the one or more rules (represented as R-n, n being a reference numeral). The data identity includes a thumbnail of each data file (represented as T-n, n being a reference numeral) and location of each data file (represented as L1, L2, and L3).

Constructional and operational details of the electronic device 102 are explained in detail referring to FIG. 2 to FIG. 14.

Figure 2:
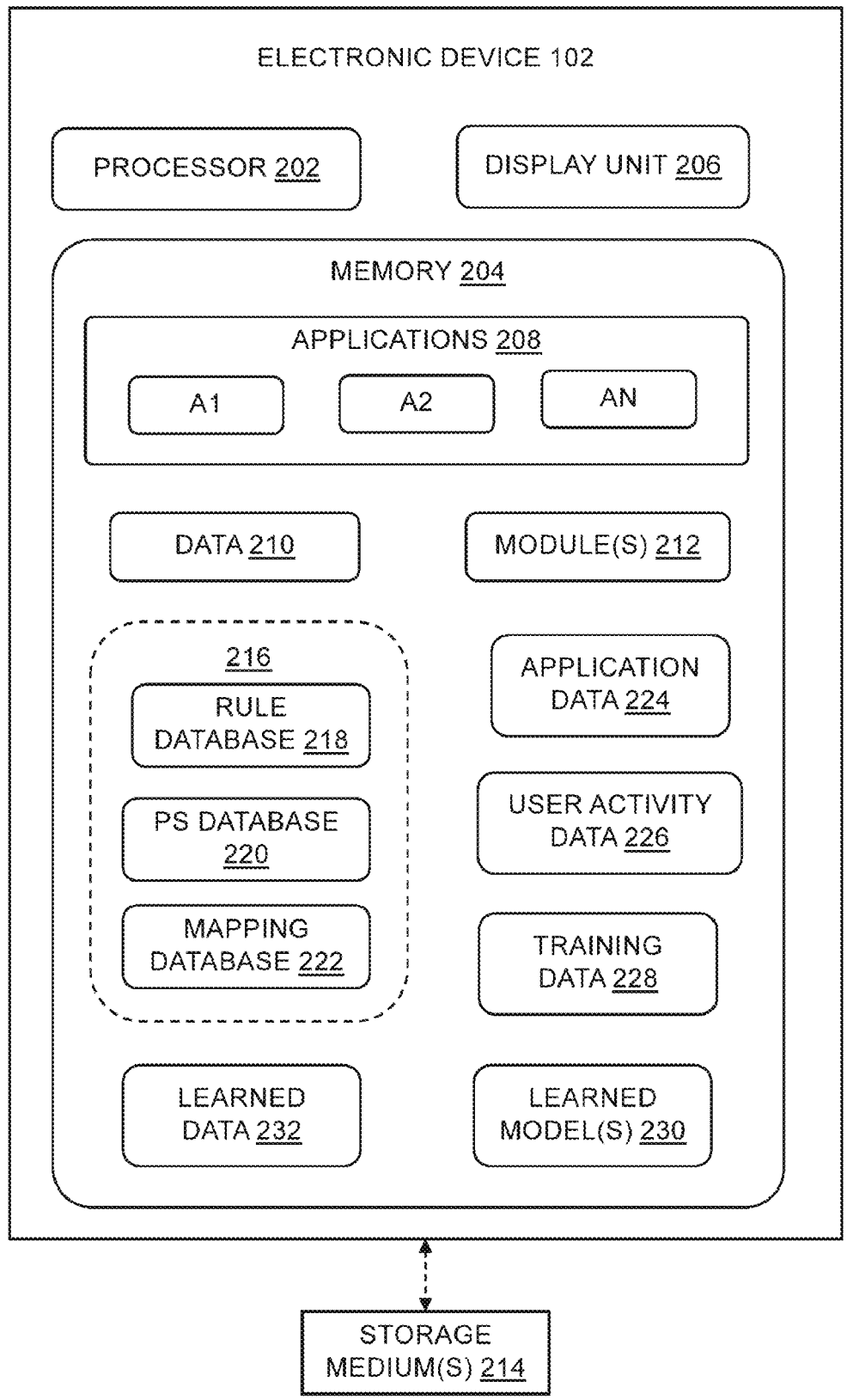
FIG. 2 illustrates a block diagram of the electronic device, according to an embodiment of the disclosure.

FIG. 2 illustrates a block diagram of the electronic device 102 in an embodiment of the disclosure. The electronic device 102 includes at least one processor 202 (also referred to herein as "the processor 202"), a memory 204, and a display unit 206. The memory 204 may store applications 208 and/or data 210. In an embodiment, the memory 204 may include module(s) 212. The processor 202, the memory 204, and the display unit 206 are communicatively coupled with each other via a bus (not shown). The data 210 may serve, among other things, as a repository for storing data processed, received, and/or generated by the module(s) 212.

The electronic device 102 also includes one or more input devices (not shown) such as a microphone, a stylus pen, a number pad, a keyboard, a cursor control device, such as a mouse, and/or a joystick, etc., and/or any other device operative to interact with the electronic device 102. The electronic device 102 also includes one or more output devices (not shown) such as speakers. The electronic device 102 may also be configured to be in communication with further storage medium(s) 214. The further storage medium(s) 214 may be internal or external to the electronic device 102 and may provide additional storage space apart from the memory 204. Examples of the further storage medium(s) 214 include but not limited to, a hard disc, a memory card, a flash drive, a USB drive, a CD, and a DVD.

The applications 208 provide various services to a user of the electronic device 102. Examples of the applications 208 include social media applications, gallery application, contact application, chat application, calendar application, etc., represented as A1, A2, . . . , AN.

The processor 202 may be a single processing unit or a number of units, all of which could include multiple computing units. The processor 202 may be implemented as one or more microprocessors, microcomputers, microcontrollers, digital signal processors, central processing units, processor cores, multi-core processors, multiprocessors state machines, logic circuitries, application-specific integrated circuits, field programmable gate arrays, and/or any devices that manipulate signals based on operational instructions. Among other capabilities, the processor 202 may be configured to fetch and/or execute computer-readable instructions and/or data, for example, the data 210, stored in the memory 204.

The memory 204 includes any non-transitory computer-readable medium known in the art including, for example, volatile memory, such as static random access memory (SRAM) and/or dynamic random access memory (DRAM), and/or non-volatile memory, such as read-only memory (ROM), erasable programmable ROM, flash memories, hard disks, optical disks, and magnetic tapes. The memory 204 includes a link database 216 for storing rules, user preferences, predefined cloud-configuration settings, and a mapping between the rules and preview information of data files stored on the CBSS 104. As such, the link database 216 includes a rule database 218 for storing the rules, a PS database 220 for storing the user preferences and the predefined cloud-configuration settings, and a mapping database 222 for storing the mapping. Further, the memory 204 includes an application data 224, a user-activity data 226, a training data 228, a learned model(s) 230, and a learned data 232. The application data 224 includes information pertaining to the one or more applications 208 on the electronic device 102. The user-activity data 226 includes information pertaining to user-activity on the electronic device 102, for example, browsing, emailing, chatting, etc. The training data 228 includes user-activity data 226 obtained by monitoring the user-activity for a predefined time period, for example, 20 days.

The display unit 206 may display various types of information (for example, data files, applications, etc.) to a user of the electronic device 102. The display unit 206 may include, but is not limited to, a liquid crystal display (LCD), a light emitting diode (LED) display, an organic LED (OLED) display, a plasma cell display, an electronic ink array display, an electronic paper display, a flexible LCD, a flexible electro-chromic display, and/or a flexible electro wetting display. The display unit 206 can also act as an input device by way of touch-input. As such, the display unit 206 can be a touch-sensitive display.

The module(s) 212, among other things, include routines, programs, objects, components, data structures, etc., which perform particular tasks or implement data types. The module(s) 212 may also be implemented as, signal processor(s), state machine(s), logic circuitries, and/or any other device and/or component that manipulate signals based on operational instructions.

Further, the module(s) 212 may be implemented as hardware, software, instructions executed by a processing unit, or by a combination thereof. The processing unit may comprise a computer, a processor, such as the processor 202, a state machine, a logic array and/or any other suitable devices capable of processing instructions. The processing unit may be a general-purpose processor which executes instructions to cause the general-purpose processor to perform the required tasks or, the processing unit may be dedicated to perform the required functions. In another aspect of the disclosure, the module(s) 212 may be machine-readable instructions (software) which, when executed by a processor/processing unit, may perform any of the described functionalities. In another aspect of the disclosure, the module(s) 212 may be part of the memory 204, as illustrated. In another aspect of the disclosure, the module(s) 212 may be part of the processor 202. In another aspect of the disclosure, the module(s) 212 may be part of hardware, separate from the processor 202.

Figure 3:
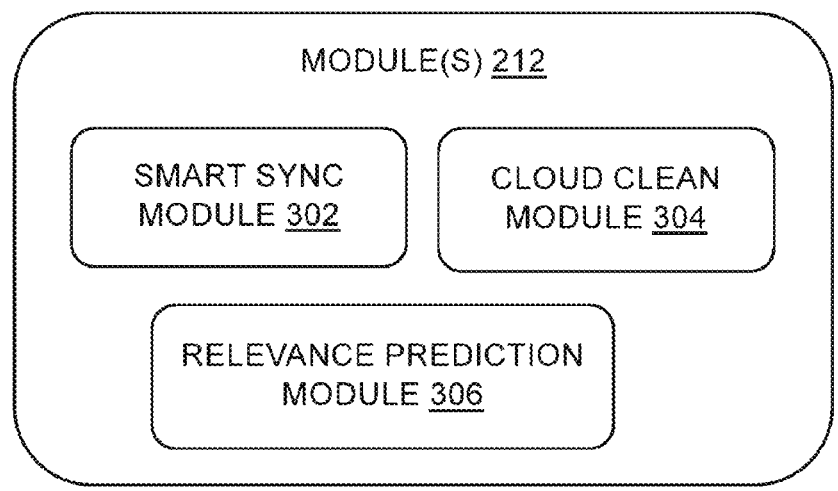
FIGS. 3-6 illustrate block diagrams of the electronic device, according to an embodiment of the disclosure.

FIG. 3 illustrates a block diagram of components in the electronic device, according to an embodiment of the disclosure. Referring to FIG. 3, in an embodiment, the module(s) 212 includes a smart sync module 302, a cloud clean module 304, and a relevance prediction module 306. The smart sync module 302, the cloud clean module 304, and the relevance prediction module 306, are in communication with each other. The module(s) 212 may be implemented as at least one hardware processor such as the processor 202.

Figure 4:
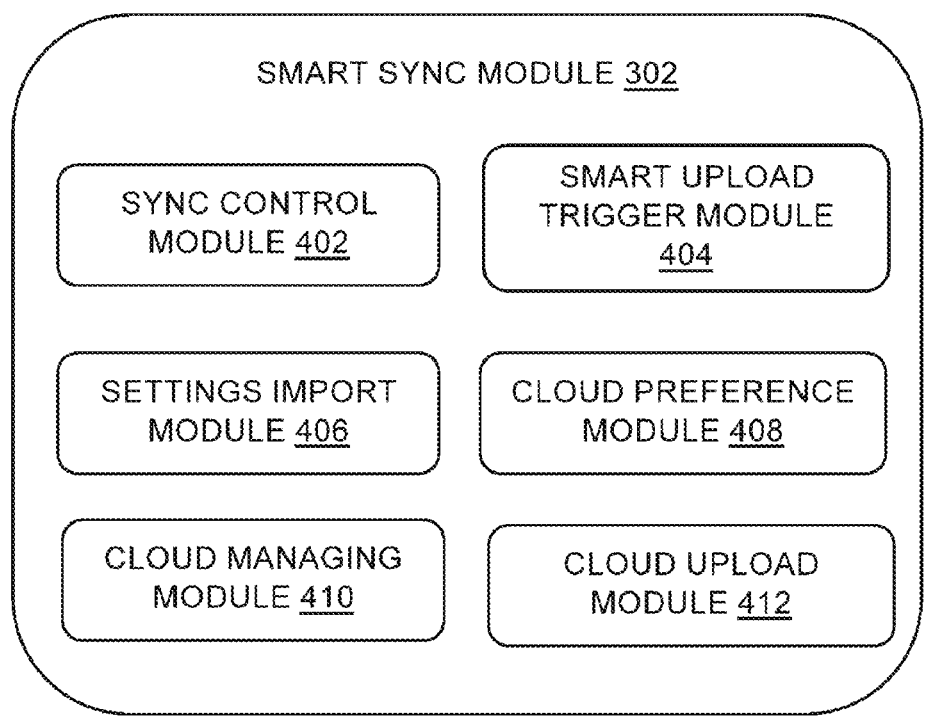

FIG. 4 illustrates a block diagram of components in the electronic device, according to an embodiment of the disclosure.

The smart sync module 302 enables synchronizing of one or more data files with one or more of the cloud-based storage systems 104 based on user's selection of file preferences and the cloud-based storage systems 104. The smart sync module 302 also enables maintaining of data identities of the all the uploaded data files. This prevents duplication of data on the plurality of cloud-based storage systems 104. Accordingly, referring to FIG. 4, the smart sync module 302 includes a sync control module 402, a smart upload trigger module 404, a settings import module 406, a cloud preference module 408, a cloud managing module 410, and a cloud upload module 412. The sync control module 402, the smart upload trigger module 404, the settings import module 406, the cloud preference module 408, the cloud managing module 410, and the cloud upload module 412 are in communication with each other.

In an embodiment, the sync control module 402 prevents auto-syncing or auto-uploading of data file(s) directly from the memory 204 and/or the storage medium(s) 214 to the cloud-based storage systems 104.

In an embodiment, the smart upload trigger module 404 detects a trigger or an event indicative of storing the data files onto the cloud-based storage systems 104. In an embodiment, the event is creating and storing data file in at least one of the memory 204 and the storage medium(s) 214.

In an embodiment, the settings import module 406 obtains predefined cloud-configuration settings from the cloud-based storage system 104 prior to transmitting data file. The predefined cloud-configuration settings include at least sync timing settings of the cloud-based storage system 104 that allow auto upload or syncing of data files from the electronic device 102 to the cloud-based storage system 104. The settings import module 406 imports predefined cloud-configuration settings from the cloud-based storage system 104 when the user selects a corresponding user-selectable option provided by the smart sync module 302. Upon importing the predefined cloud-configuration settings, the settings import module 406 sets sync timings for the auto-syncing or auto-uploading of data file(s). This leads to elimination of requirement for specific application program interfaces (APIs) related to the cloud-based storage systems 104 for importing the predefined configuration settings such that user's preferences can be synched. The predefined cloud-configuration settings can be stored in PS database 220.

In an embodiment, the cloud preference module 408 manages user-preference data, which is indicative of which type of data file are to be uploaded or stored into which of the cloud-based storage systems 104. The user can select such user-preference by selecting user-selectable options provided by the smart sync module 302. The user preferences may be stored in the PS database 220.

In an embodiment, the cloud managing module 410 manages an account, created by the user, with each of the cloud-based storage services to access the cloud-based storage systems 104. It would be understood that appropriate authorization mechanisms will be incorporated while accessing such accounts.

In an embodiment, the cloud upload module 412 uploads or stores data file(s) into the cloud-based storage systems 104. The sync control module 402 transfers a control of auto-syncing or auto-uploading to the cloud upload module 412. Thus, in an embodiment, the cloud upload module 412 may auto-sync or transmit data file to the cloud-based storage systems 104 for storage instantaneously in accordance with the user-preference data, i.e., as soon as the data file is created without consuming extra resources such as battery, memory, etc. This also alleviates the problem of losing a data file created in the last 'n' hours whose synchronization with the cloud-based storage system 104 has not been triggered and the electronic device 102 gets damaged or lost before synchronizing the data file. In an embodiment, the cloud upload module 412 may auto-sync or transmit data file based on the predefined cloud-configuration settings pertaining to the cloud-based storage systems 104 and user-preference data. Thus, user's syncing preference remains the same as selected for respective cloud-based storage systems 104.

Referring back to FIG. 3, the cloud clean module 304 enables reshuffling of all the data files present in the user selected cloud-based storage system 104 among each other as per user selected file preferences. This helps in managing already existing data files present on the cloud-based storage systems 104 and thereby preventing duplication. Further, the relevance prediction module 306 enables accessing relevant data file as per user's current requirements. The relevance prediction module 306 determines relevance of each of the data files usage and segregates the data files into logical groups, where each logical group is formed on the basis of learned data, for example, the learned data 232, obtained from the plurality of work-units detected on the electronic device 102. The work-unit is defined as a single task performed by the user on the electronic device 102.

Figure 5:
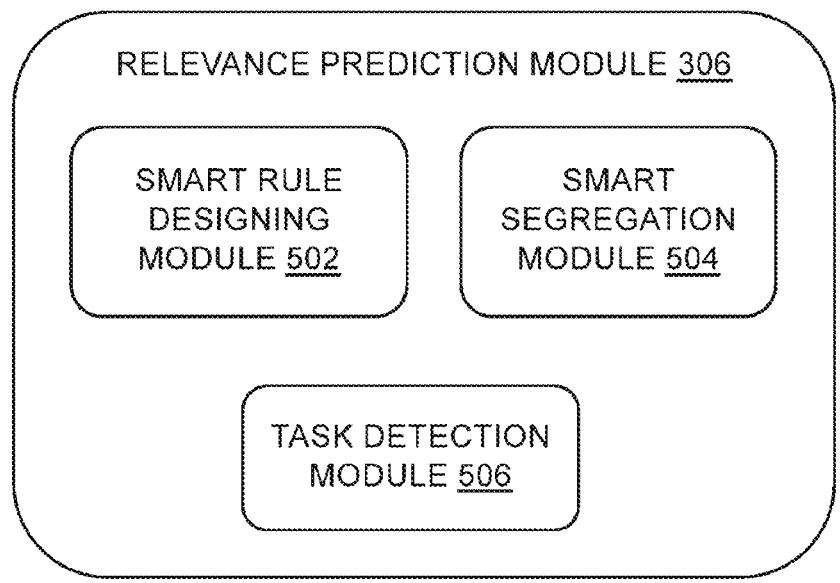

FIG. 5 illustrates a block diagram of components in the electronic device, according to an embodiment of the disclosure.

Figure 6:
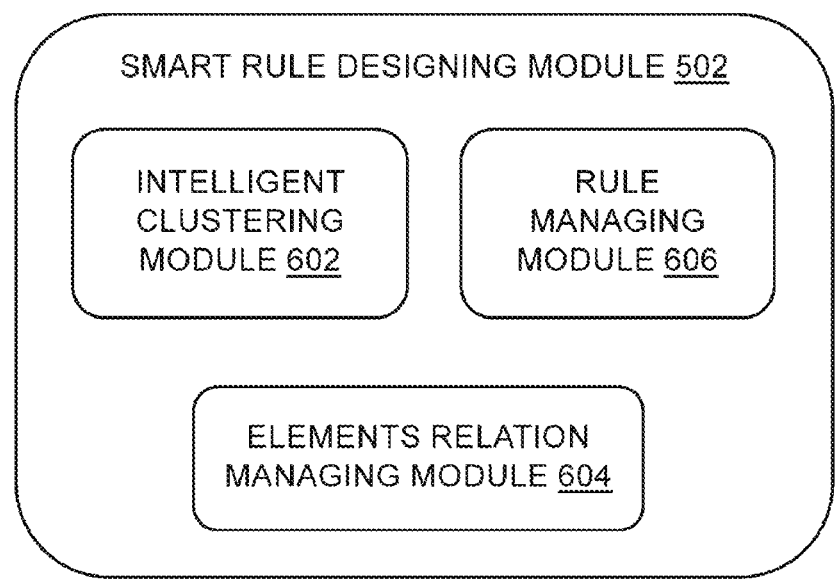

FIG. 6 illustrates a block diagram of components in the electronic device, according to an embodiment of the disclosure.

Referring to FIG. 5, the relevance prediction module 306 includes a smart rule designing module 502, a smart segregation module 504, and a task detection module 506. The smart rule designing module 502, the smart segregation module 504, and the task detection module 506 are in communication with each other. Referring to FIG. 6, the smart rule designing module 502 learns the user's work pattern by monitoring or detecting work-units performed by the user on the electronic device 102 and determining elements corresponding to each of the work-units to define rules customized for a particular user. The elements are breakup of the task into smallest meaningful units. The rules are weightage based associations between the elements. The smart rule designing module 502 enables creation of the learned model(s) 230, and the learned data 232 based on the application data 224, the user-activity data 226, and the training data 228. In an embodiment, the smart rule designing module 502 may be implemented as an unsupervised machine learning engine. Accordingly, referring to FIG. 6, the smart rule designing module 502 includes an intelligent clustering module 602, elements relation managing module 604, and a rule managing module 606. The intelligent clustering module 602, the elements relation managing module 604, and the rule managing module 606 are in communication with each other.

Referring back to FIG. 5, the smart segregation module 504 analyses content of the data files being stored in the cloud-based data storage systems 104 to map the data identities of the data files with relevant rules designed specifically for the user based on the learned data as preview information. In an embodiment, the smart segregation module 504 may be implemented as a supervised machine learning engine.

Further, the task detection module 506 determines one or more data files (stored in the cloud-based storage systems 104) are useful or relevant to the user based on current work-unit and the rules. The task detection module 506 then fetches preview information based on the rules and presents the preview information on the electronic device 102. In an embodiment, the task detection module 506 may be implemented as a machine learning engine.

In an embodiment, operations described herein as being performed by any or all of the electronic device 102 and the module(s) 212 may be performed by at least one processor (e.g., the processor 202). According to some other example embodiment, operations described herein as being performed by any of the module(s) 212 may be performed by any other software or a combination thereof.

Each of the aforementioned modules and corresponding operations performed by the modules is explained in detail in the description of FIG. 7 to FIG. 13.

As described earlier, the smart sync module 302 functions over current syncing mechanisms provided by the cloud-based storage systems 104, when the user creates an account with corresponding cloud-based service in a manner as known in the art. As such, the smart sync module 302 helps the user to sync data files sequentially on different cloud-based storage systems 104 as per user's preference. This leads to efficient management of data files among the different cloud-based storage systems 104. Accordingly, referring to FIG. 7, FIG. 8, and FIG. 9, example data flow diagrams are illustrated depicting operations of the smart sync module 302 for storing of data files on the plurality of cloud-based storage systems 104. The smart sync module 302 may be a defined as an intelligent layer applied over a media provider layer 702. The media provider layer 702 may be defined as an interface through which the cloud-based storage systems 104 interact with the memory 204 and/or the storage medium(s) 214 for synchronization of data files as known in the art. To such end, the media provider layer 702 provides indexed collection of data files from the memory 204 and/or the storage medium(s) 214. In an embodiment, the smart sync module 302 interfaces with the media provider layer 702 such that the interaction of the cloud-based storage systems 104 with the memory 204 and/or the storage medium(s) 214 is through the smart sync module 302. This leads to prevention of one-way communication of data files being uploaded to the cloud-based storage systems 104 without any control at the electronic device 102. The smart sync module 302 applies user-preference data while uploading data files to the cloud-based storage systems 104. This leads to a two-way communication where a data file will only upload to the cloud-based storage systems 104 in accordance with user preference and user control at the electronic device 102. The module(s) introduced referring to FIG. 3 through FIG. 6 may be implemented as at least one hardware processor such as the processor 202.

Figure 7:
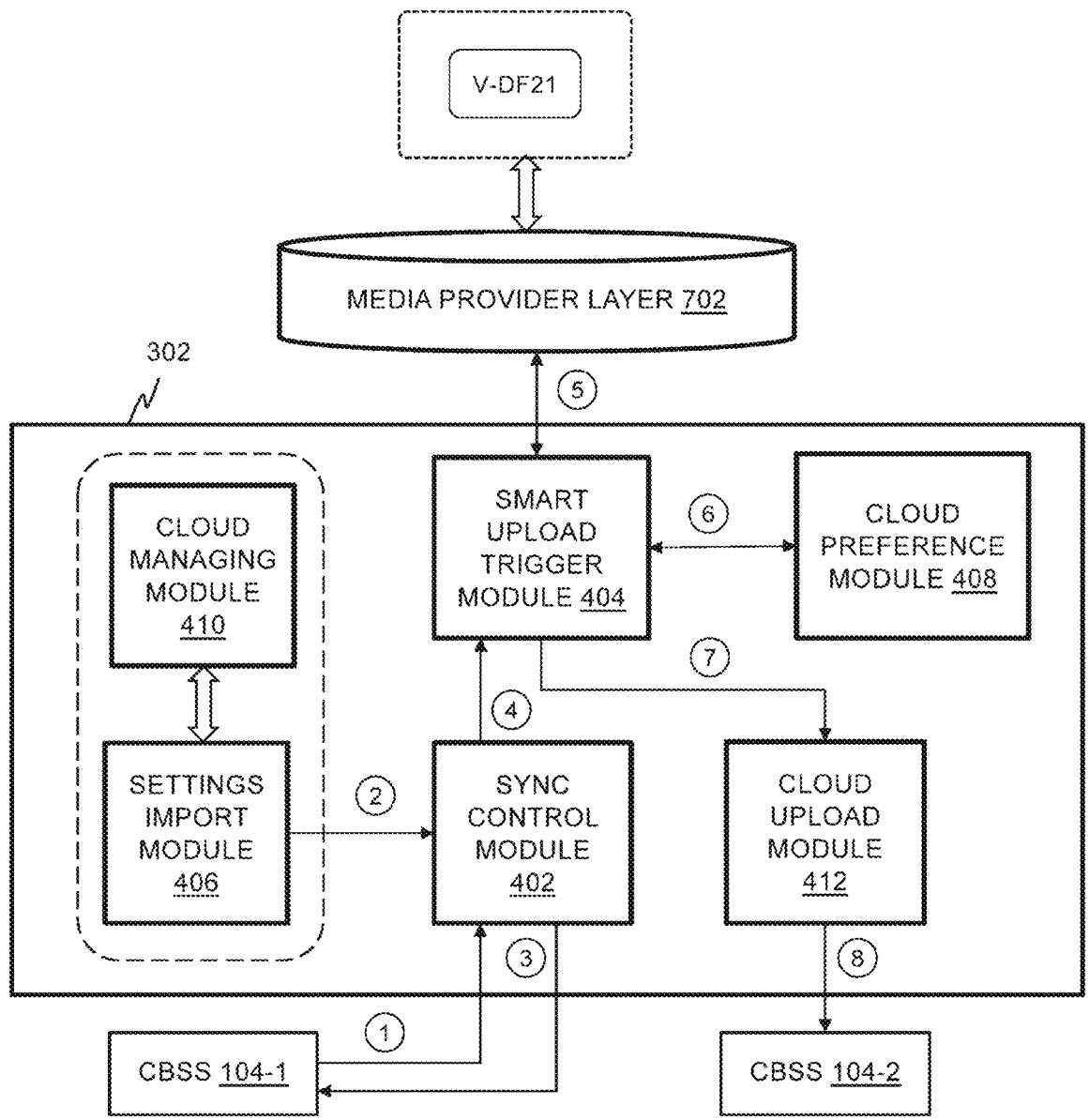
FIGS. 7-9 illustrate example data flow diagrams for storing of data files on the plurality of cloud-based storage systems, according to an embodiment of the disclosure.

FIG. 7 illustrates an example data flow diagram for storing of data files on the plurality of cloud-based storage systems, according to an embodiment of the disclosure.

Referring to FIG. 7, operations of the smart sync module 302 are depicted in accordance with an embodiment. During initialization of operations, the cloud managing module 410 manages accounts for the cloud-based storage system 104. The settings import module 406 obtains and stores the predefined configuration settings of the cloud-based storage systems 104 in the memory 204. The cloud preference module 408 obtains and stores the user-preference data in the memory 204.

At step 1, the sync control module 402 detects a request from one or more of the plurality of cloud-based storage systems 104, for example, cloud-based storage system 104-1, to access at least one data file, for example, V-DF21, for storing or auto-syncing.

At step 2, the sync control module 402 determines the availability of the predefined configuration settings from the settings import module 406. The settings import module 406 indicates the predefined configuration settings are not available for the cloud-based storage system 104-1.

Accordingly, at step 3, the sync control module 402 prevents the transmission of the data file to the cloud-based storage system 104-1. However, at step 4, the sync control module 402 transfers the request to the smart upload trigger module 404.

At step 5, the smart upload trigger module 404 obtains the at least one data file, for example, V-DF21, as requested by, for example, the cloud-based storage system 104-1, from the memory 204 and/or storage medium(s) 214 through the media provider layer 702.

At step 6, the cloud preference module 408 selects at least one cloud-based storage system 104, for example, the cloud-based storage system 104-2 from the plurality of cloud-based storage systems 104 for storing the at least one data file, for example, V-DF21, based on user-preference data stored in the memory 204. For example, the user-preference data indicates video type data files are to be stored in the cloud-based storage system 104-2.

To this end, the smart upload trigger module 404 transmits characteristic of the at least one data file to the cloud preference module 408. The characteristic of the at least one data file includes any or all of file type, file name, file size, an indication of whether the data file is protected, and indication of whether the data file is encrypted. Based on the characteristic of the at least one data file and the user-preference data, the cloud preference module 408 selects the at least one cloud-based storage system 104, for example, the cloud-based storage system 104-2. The cloud preference module 408 transmits information about the at least one selected cloud-based storage system 104, for example, the cloud-based storage system 104-2 to the smart upload trigger module 404.

At step 7, the cloud upload module 412 obtains the information about the at least one selected cloud-based storage system 104, for example, the cloud-based storage system 104-2 from the smart upload trigger module 404. At step 8, the cloud upload module 412 stores the at least one data file into the at least one selected cloud-based storage system 104, for example, the cloud-based storage system 104-2.

Figure 8:
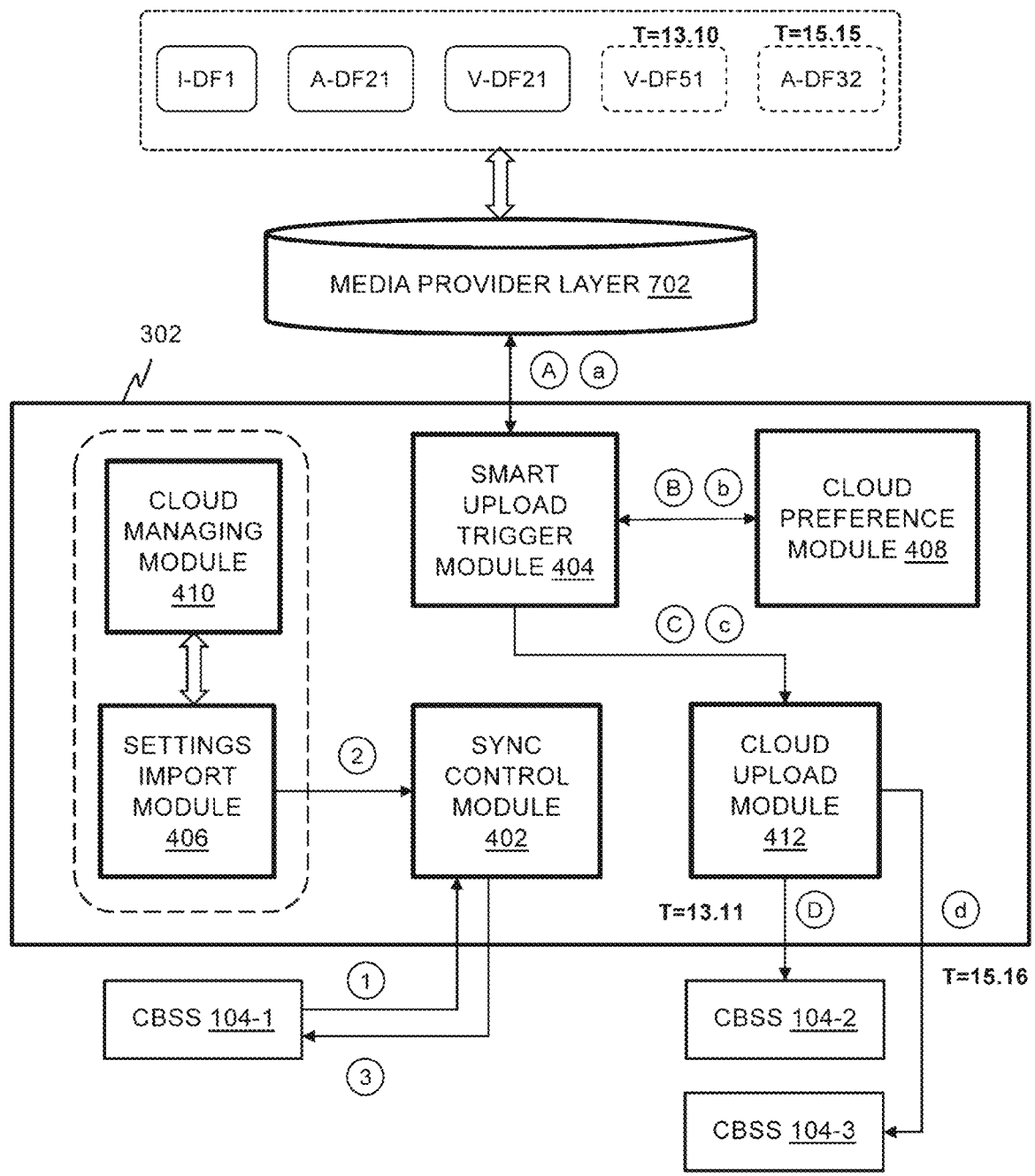

FIG. 8 illustrates an example data flow diagram for storing of data files on the plurality of cloud-based storage systems, according to an embodiment of the disclosure.

Referring to FIG. 8, operations of the smart sync module 302 are depicted in accordance with another embodiment. During initialization of operations, the cloud managing module 410 manages accounts for the cloud-based storage system 104 the settings import module 406. The settings import module 406 obtains and stores the predefined configuration settings of the cloud-based storage systems 104 in the memory 204. The cloud preference module 408 obtains and stores the user-preference data in the memory 204.

At step 1, the sync control module 402 detects a request from one or more of the plurality of cloud-based storage systems 104, for example, cloud-based storage system 104-1, to access at least one data file for storing or auto-syncing.

At step 2, the sync control module 402 determines the availability of the predefined configuration settings from the settings import module 406. The settings import module 406 indicates the predefined configuration settings are not available for the cloud-based storage system 104-1.

Accordingly, at step 3, the sync control module 402 prevents the transmission of the data file to the cloud-based storage system 104-1.

At step A and at time 13.10, the smart upload trigger module 404 detects a creation of new data file, for example, V-DF51. The smart upload trigger module 404 determines the availability of the predefined configuration settings from the settings import module 406. The settings import module 406 indicates the predefined configuration settings are not available for the cloud-based storage systems 104.

At step B, the cloud preference module 408 selects at least one cloud-based storage system 104, for example, the cloud-based storage system 104-2 from the plurality of cloud-based storage systems 104 for storing the at least one data file, for example, V-DF51, based on user-preference data stored in the memory 204. For example, the user-preference data indicates video type data files are to be stored in the cloud-based storage system 104-2.

At step C, the cloud upload module 412 obtains the information about the selected at least one cloud-based storage system 104, for example, the cloud-based storage system 104-2 from the smart upload trigger module 404. At step D and at time 13.11, the cloud upload module 412 stores the at least one data file into the selected at least one cloud-based storage system 104, for example, the cloud-based storage system 104-2.

At step a and at time 15.15, the smart upload trigger module 404 detects a creation of new data file, for example, A-DF32. The smart upload trigger module 404 determines the availability of the predefined configuration settings from the settings import module 406. The settings import module 406 indicates the predefined configuration settings are not available for the cloud-based storage systems 104.

At step b, the cloud preference module 408 selects at least one cloud-based storage system 104, for example, the cloud-based storage system 104-3 from the plurality of cloud-based storage systems 104 for storing the at least one data file, for example, A-DF32, based on user-preference data stored in the memory 204. For example, the user-preference data indicates audio type data files are to be stored in the cloud-based storage system 104-3.

At step c, the cloud upload module 412 obtains the information about the selected at least one cloud-based storage system 104, for example, the cloud-based storage system 104-3 from the smart upload trigger module 404. At step d and at time 15.16, the cloud upload module 412 stores the at least one data file into the selected at least one cloud-based storage system 104, for example, the cloud-based storage system 104-3.

Thus, in absence of the predefined configuration settings of the cloud-based storage systems 104, the sync control module 402 prevents uploading or syncing of the data files to the cloud-based storage systems 104. At same time, the cloud upload module 412 stores/uploads/syncs any data file into respective cloud-based storage systems 104 based on user-preference data.

Figure 9:
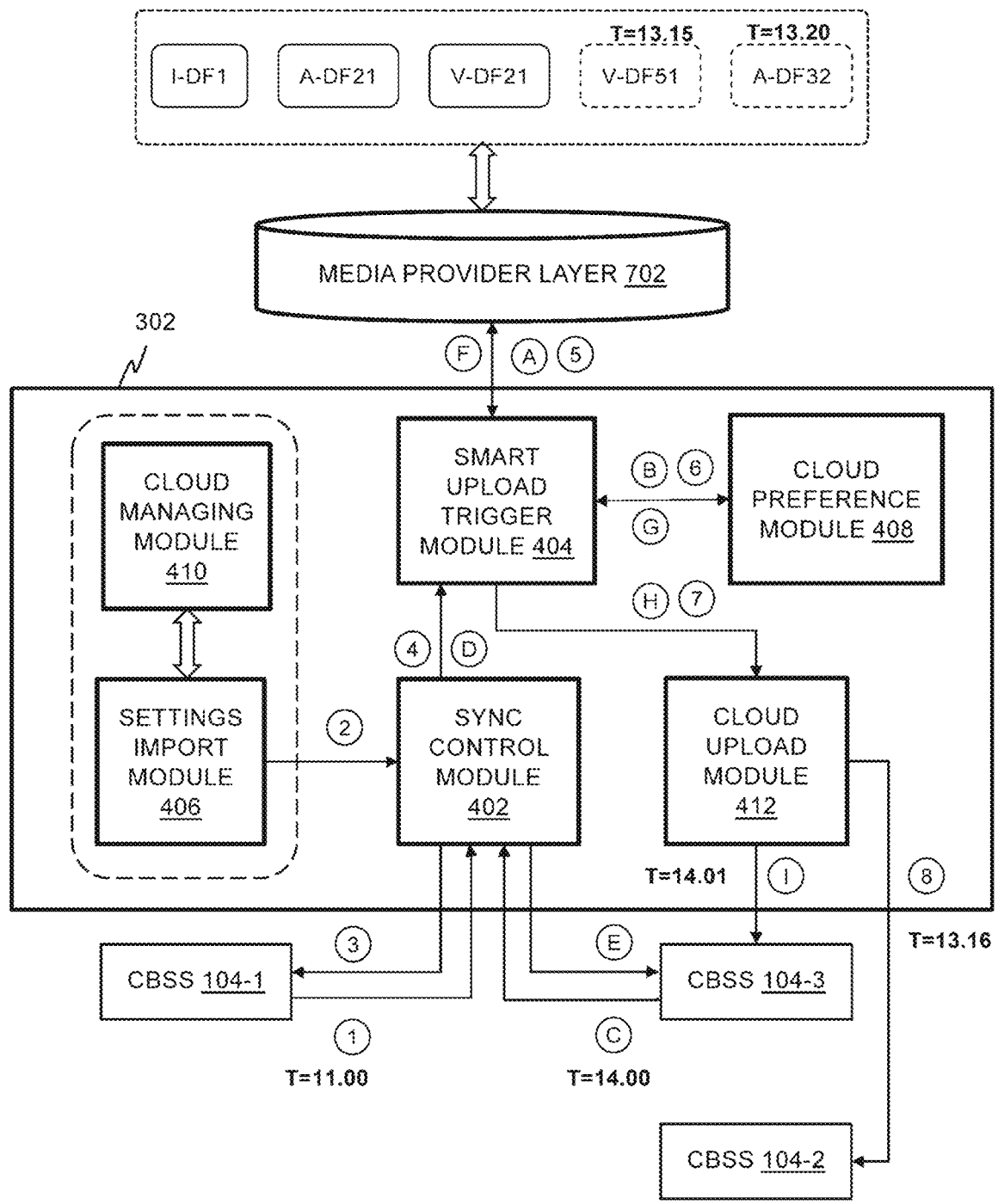

FIG. 9 illustrates an example data flow diagram for storing data files on the plurality of cloud-based storage systems, according to an embodiment of the disclosure.

Referring to FIG. 9, operations of the smart sync module 302 are depicted in accordance with one another embodiment. During initialization of operations, the cloud managing module 410 manages accounts for the cloud-based storage system 104 the settings import module 406. The settings import module 406 obtains and stores the predefined configuration settings of the cloud-based storage systems 104 in the memory 204. The cloud preference module 408 obtains and stores the user-preference data in the memory 204.

At step 1 and at time 11.00, the sync control module 402 detects a request from one or more of the plurality of cloud-based storage systems 104, for example, cloud-based storage system 104-1, to access at least one data file for storing or auto-syncing.

At step 2, the sync control module 402 determines the availability of the predefined configuration settings from the settings import module 406. The settings import module 406 indicates the predefined configuration settings are available for the cloud-based storage system 104-1 and the auto-syncing is scheduled when time is 12.00.

Accordingly, at step 3, the sync control module 402 prevents the transmission of the data file to the cloud-based storage system 104-1 at time 11.00. However, at step 4, the sync control module 402 transfers the request to the smart upload trigger module 404.

At step 5 and at time 13.15, the smart upload trigger module 404 detects creation of new data file, for example, V-DF51.

At step 6, the cloud preference module 408 selects at least one cloud-based storage system 104, for example, the cloud-based storage system 104-2 from the plurality of cloud-based storage systems 104 for storing the at least one data file, for example, V-DF21, based on user-preference data stored in the memory 204. For example, the user-preference data indicates video type data files are to be stored in the cloud-based storage system 104-2. Thus, the user-preference data may represent and/or include a preference of certain cloud-based storage used to store certain type of data files such as audio, video, documents, images, etc.

At step 7, the cloud upload module 412 obtains the information about the selected at least one cloud-based storage system 104, for example, the cloud-based storage system 104-2 from the smart upload trigger module 404. At step 8 and at time 13.16, the cloud upload module 412 stores the at least one data file into the selected at least one cloud-based storage system 104, for example, the cloud-based storage system 104-2.

At step A and at time 13.20, the smart upload trigger module 404 detects creation of new data file, for example, A-DF32.

At step B, the cloud preference module 408 selects at least one cloud-based storage system 104, for example, the cloud-based storage system 104-2 from the plurality of cloud-based storage systems 104 for storing the at least one data file, for example, A-DF32, based on user-preference data stored in the memory 204. For example, the user-preference data indicates audio type data files are to be stored in the cloud-based storage system 104-3.

The smart upload trigger module 404 then obtains the information about the selected at least one cloud-based storage system 104, for example, the cloud-based storage system 104-3 from the cloud preference module 408. The smart upload trigger module 404 determines the availability of the predefined configuration settings from the settings import module 406. The settings import module 406 indicates the predefined configuration settings are available for the cloud-based storage system 104-2 at time 14.00. As such, the smart upload trigger module 404 prevents further processing of the data file A-DF32.

At step C and at time 14.00, the sync control module 402 detects a request from one or more of the plurality of cloud-based storage systems 104, for example, cloud-based storage system 104-3, to access at least one data file for storing or auto-syncing.

At step D, the sync control module 402 determines the availability of the predefined configuration settings from the settings import module 406. The settings import module 406 indicates the predefined configuration settings are available for the cloud-based storage system 104-1 and the auto-syncing is scheduled when time is 14.00.

Accordingly, at step E, the sync control module 402 prevents the transmission of the data file to the cloud-based storage system 104-3 at time 14.00. However, at step 4, the sync control module 402 transfers the request to the smart upload trigger module 404.

At step F, the smart upload trigger module 404 obtains the at least one data file, for example, A-DF32, as requested by, for example, the cloud-based storage system 104-3, from the memory 204 and/or storage medium(s) 214 through the media provider layer 702.

At step G, the cloud preference module 408 selects at least one cloud-based storage system 104, for example, the cloud-based storage system 104-3 from the plurality of cloud-based storage systems 104 for storing the at least one data file, for example, A-DF32, based on user-preference data stored in the memory 204. For example, the user-preference data indicates audio type data files are to be stored in the cloud-based storage system 104-3.

At step H, the cloud upload module 412 obtains the information about the selected at least one cloud-based storage system 104, for example, the cloud-based storage system 104-2 from the smart upload trigger module 404. At step I, the cloud upload module 412 stores the at least one data file into the selected at least one cloud-based storage system 104, for example, the cloud-based storage system 104-2.

Thus, in presence of the predefined configuration settings of the cloud-based storage systems 104, the sync control module 402 prevents uploading or syncing of the data files to the cloud-based storage systems 104. At same time, the cloud upload module 412 stores/uploads/syncs any data file into respective cloud-based storage systems 104 based on user-preference data and the predefined configuration settings.

Figure 10A:
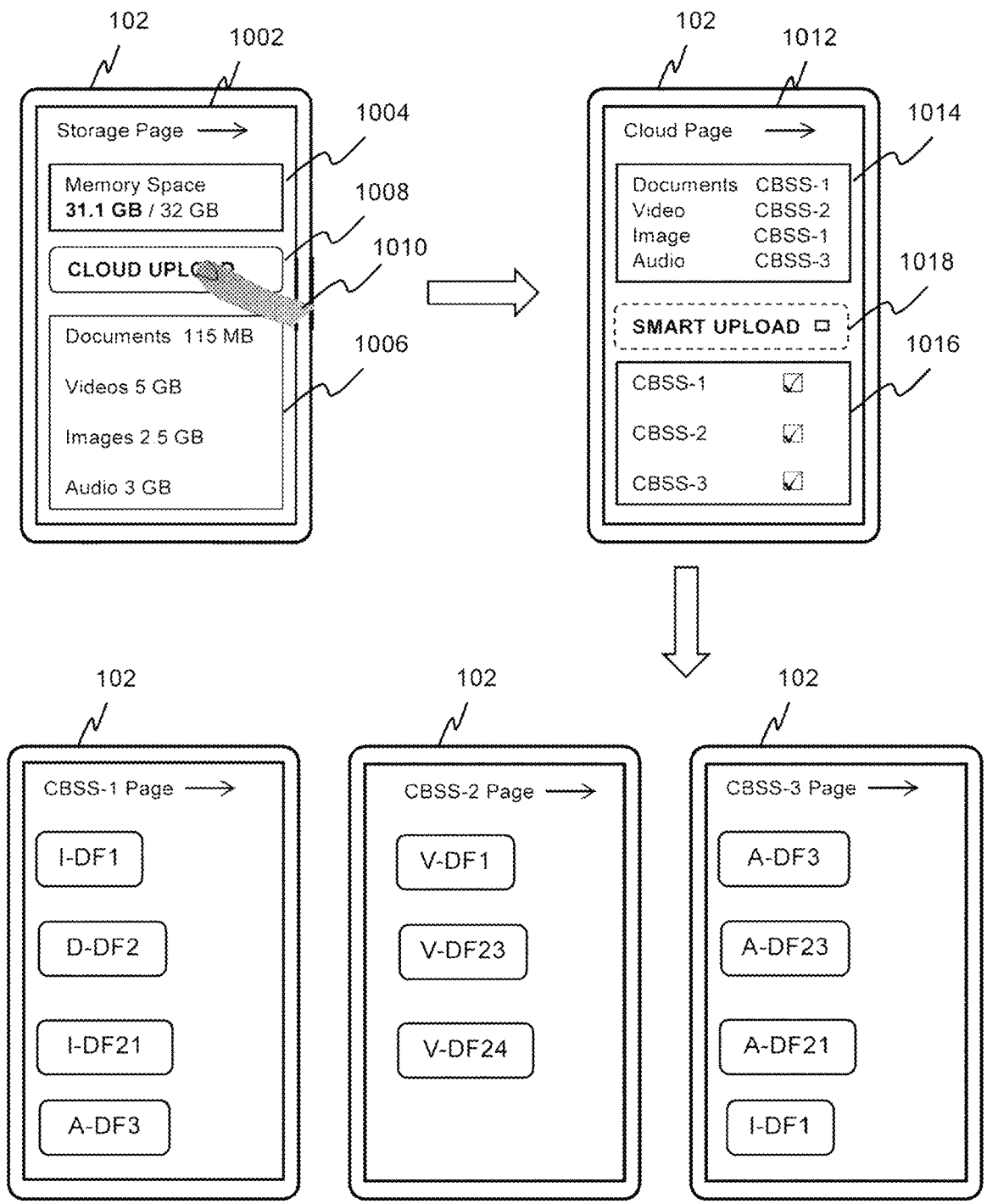
FIG. 10A and FIG. 10B illustrate example user-interfaces for storing data files on the plurality of cloud-based storage systems, according to an embodiment of the disclosure.
Figure 10B:
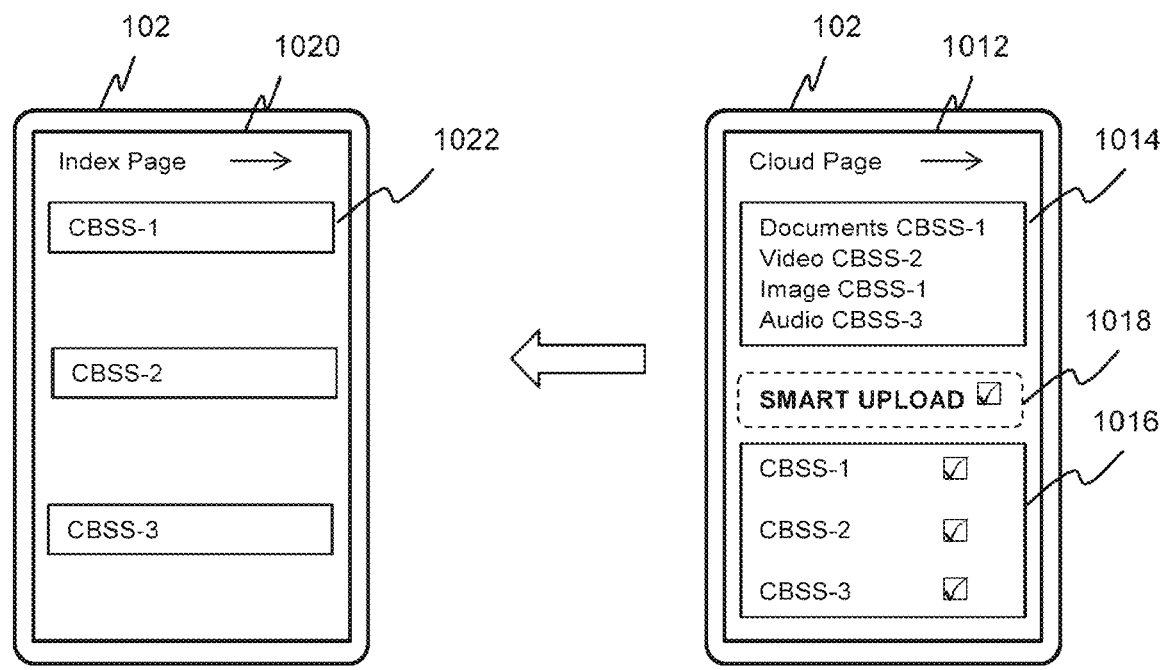

FIG. 10A and FIG. 10B illustrate example user-interfaces for storing data files on the plurality of cloud-based storage systems, according to an embodiment of the disclosure.

Referring to FIG. 10A, a storage page 1002 on the electronic device 102 is illustrated. The storage page 1002 may be displayed upon accessing settings application on the electronic device 102. The storage page 1002 includes a notification 1004 indicating how much of memory space is available within the memory 204 and a list 1006 indicating which type of data files are occupying how much memory space. The smart sync module 302 provides a user-selectable option 1008 or 'cloud upload' option 1008 on the storage page 1002 to enable the user to upload data files onto the cloud-based storage systems 104. The user-selectable option 1008 may be in form of an icon or a button, and can have any suitable name.

Upon receiving a user-input 1010 indicative of selecting the user-selectable option 1008, the smart sync module 320 opens a cloud page 1012. The smart sync module 320 provides user-selectable preference options 1014 on the cloud page 1012 to enable the user to select which type of data files are to be uploaded on to which of the cloud-based storage systems 104. The cloud page 1012 also includes a list 1016 of cloud-based storage systems 104 connected with or in communication with the electronic device 102 once the user has created the accounts. As would be understood, the cloud-based storage systems 104 is enabled on the cloud page 1012 by way of toggle buttons for auto-upload of data files.

Referring to FIG. 10A, image type data files and document type data files are selected for uploading onto cloud-based storage systems 104-1 (CBSS-1), video type files are selected for uploading onto cloud-based storage systems 104-2 (CBSS-2), and audio type data files are selected for uploading onto cloud-based storage systems 104-3 (CBSS-3). Upon receiving the user-selectable preference options 1014 and the toggle buttons, corresponding data files are uploaded on to the selected cloud-based storage systems 104, in a manner as described referring to FIG. 7 to FIG. 9. The user preferences are stored in the memory 204 as user-preference data. The user preferences may be changed at a later instance of time as per user requirement. Accordingly, the smart sync module 302 uploads the data files as per the selection.

Referring to FIG. 10A again, in an embodiment, the smart sync module 302 provides a user-selectable preference option or smart-upload option 1018 on the cloud page 1012 to enable auto-uploading of the data files smartly or intelligently based on one or more rules mapped with each of the data files. The one or more rules and their mapping will be explained in other paragraphs. The data files are uploaded to the respective cloud-based systems which is associated with the particular rule. In case, multiple rules are associated with a data file, the most appropriate rule is identified and the content is uploaded to associated cloud. The user-selectable preference option may be in a form of an icon or a button, and can have any suitable name.

Referring to FIG. 10B, in an embodiment, the smart-upload option 1018 is enabled by way of toggle-button and user-input selecting the toggle button. Upon enabling the smart-upload option 1018, the smart sync module 302 uploads the files and opens a cloud index page 1020. The cloud index page 1020 provides a list 1022 indicating the cloud-based systems 104 and/or the rules mapped with them. In an embodiment, the user selects his or her preferences.

Further, as described above, the cloud clean module 304 helps the user to manage already uploaded data files among multiple cloud-based systems 104 in a format/preference decided by the user. As such, the cloud clean module 304 runs in background along with the smart sync module 320. Once the files are uploaded onto the cloud-based systems 104 in a manner as described in reference to, the cloud clean module 304 identifies at least one duplicate copy of the data file stored in one or more of the plurality of the cloud-based storage systems 104. The cloud clean module 304 identifies the at least one duplicate copy using techniques as known in the art. The cloud clean module 304 deletes the at least one duplicate copy of the data file based on the user-preference data stored in the memory 204.

Figure 11:
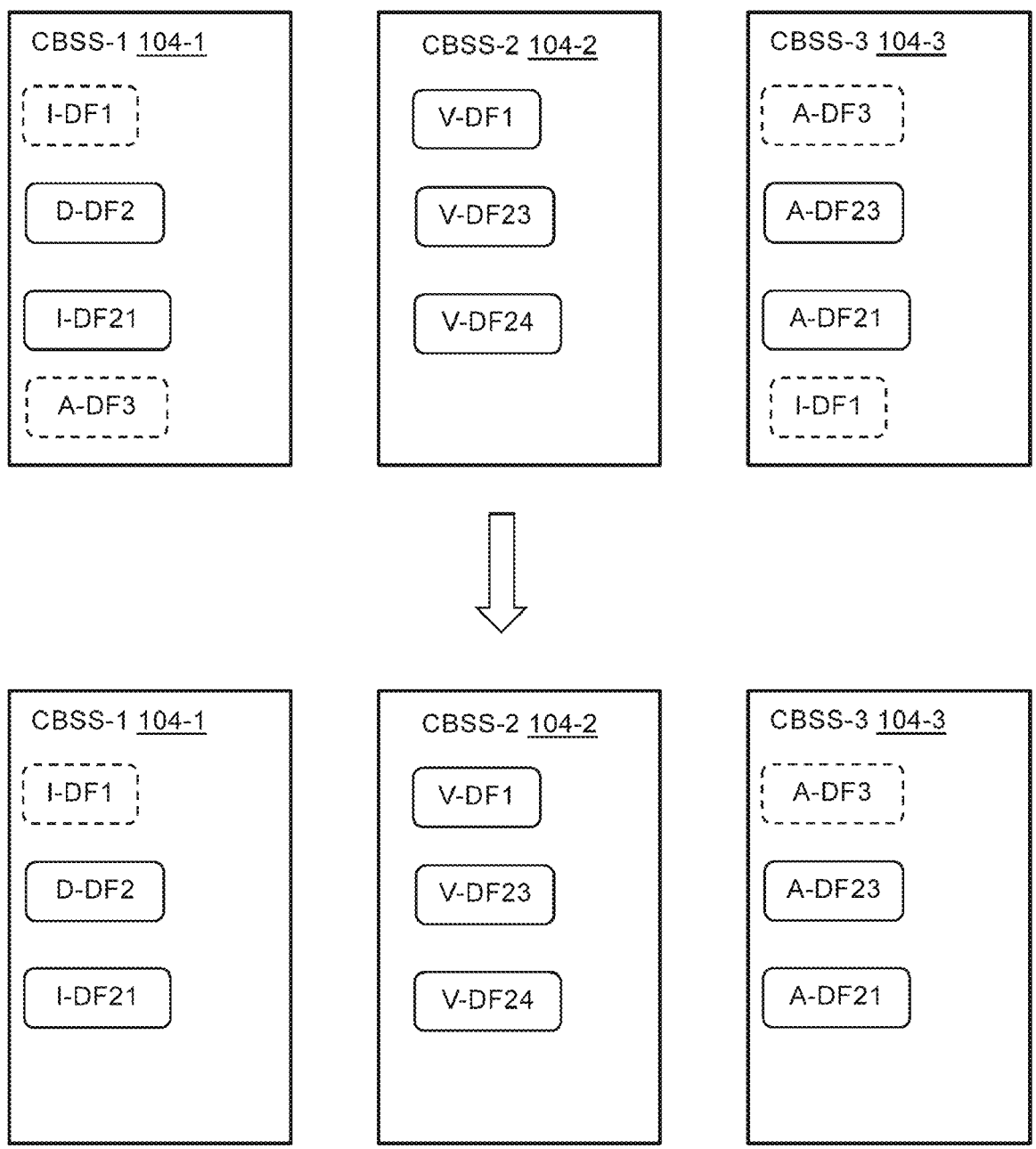
FIG. 11 illustrates example user-interfaces for storing data files on the plurality of cloud-based storage systems, according to an embodiment of the disclosure.

FIG. 11 illustrates example user-interfaces for storing data files on the plurality of cloud-based storage systems, according to an embodiment of the disclosure.

Referring to FIG. 11, image data file I-DF1 is present on both cloud-based system 104-1 and cloud-based system 104-3. Similarly, audio data file A-DF3 is present on both cloud-based system 104-1 and cloud-based system 104-3. Based on the user preference received through the user-selectable preference options 1014, as described in reference to FIG. 10A and FIG. 10B, the cloud clean module 304 may identify the duplicate copy of the image data file I-DF1 and the audio data file A-DF3 and may delete the duplicate data files. As such, image data file I-DF1 is present only on the cloud-based system 104-1 and audio data file A-DF3 is present only on the cloud-based system 104-3, in accordance with the user-preference data.

Figure 12A:
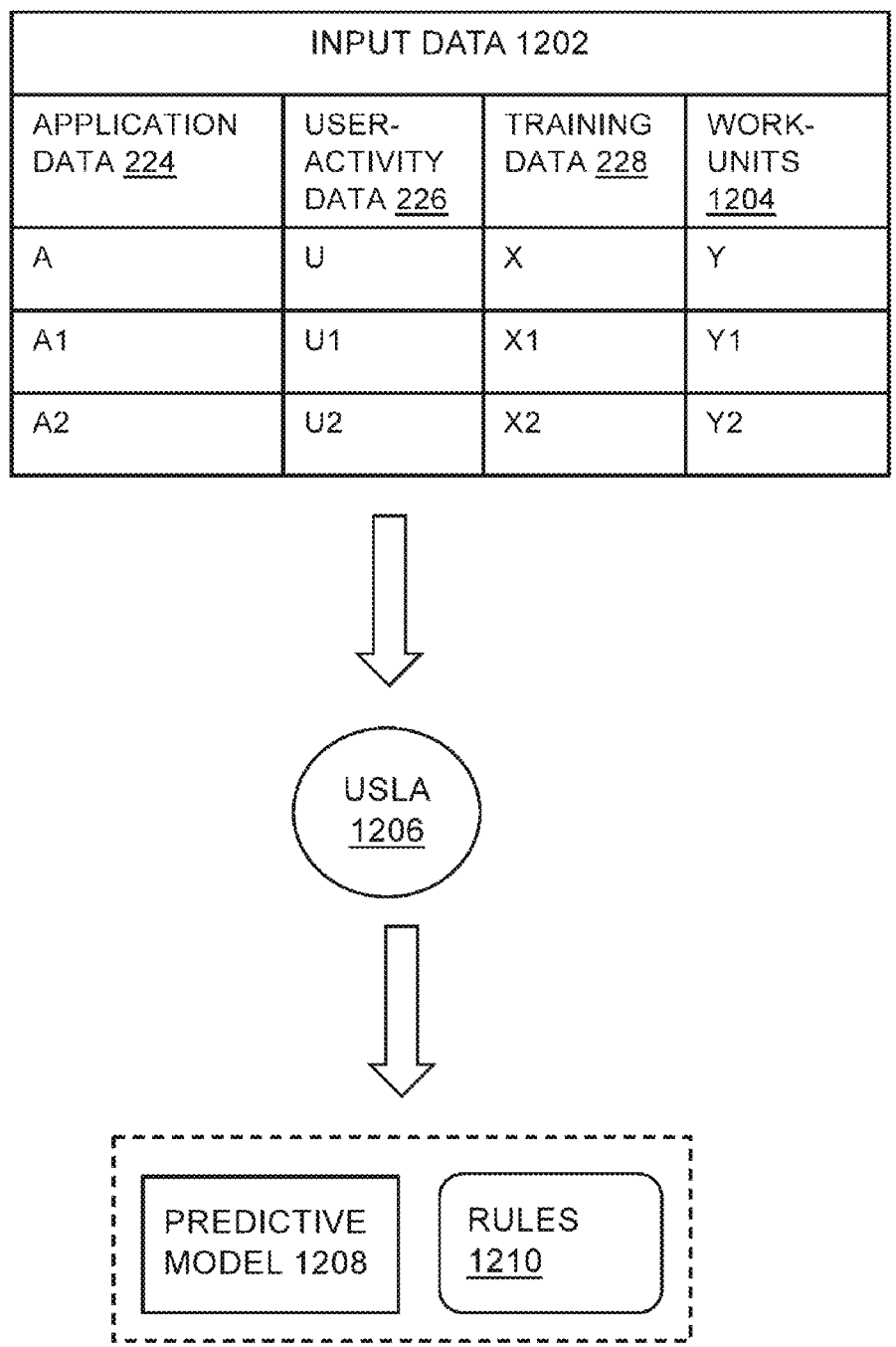
Figure 12C:
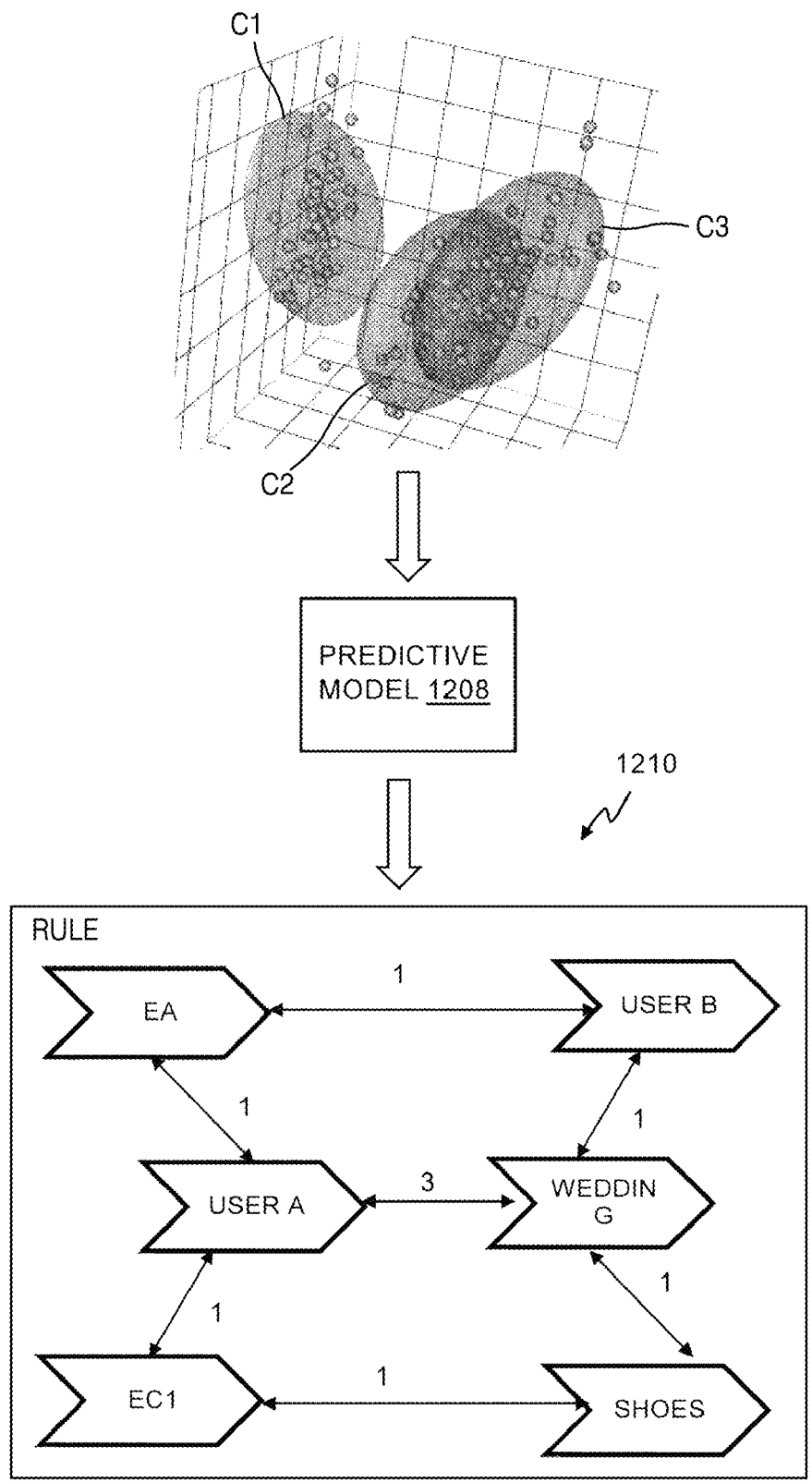

FIG. 12A, FIG. 12B, and FIG. 12C illustrate example data flows for storing and searching data files on the plurality of cloud-based storage systems, according to embodiments of the disclosure.

Further, as described earlier, the relevance prediction module 306 predicts the relevance of a file usage and segregates the files into logical groups, where each logical group is formed based on results provided by learning the user's work pattern. To this end, the smart rule designing module 502 determines one or more rules based on the learned data 232. The smart rule designing module 502 obtains the learned data 232 from at least one of the training data 228, the plurality of elements identified across a plurality of work-units detected prior to the event, the application data 224, and the user-activity data 226.

To this end, referring to FIG. 12A, the smart rule designing module 502 obtains input data 1202 by monitoring or detecting the training data 228, the application data 224, and the user-activity data 226, and a plurality of work-units 1204 performed by the user on the electronic device 102. The work-unit is defined as a single task or user-activity performed by the user on the electronic device 102, for example, browsing, emailing, chatting, etc. The smart rule designing module 502 applies unsupervised machine learning algorithms (USLA) 1206 to generate a predictive model 1208, which can be stored in the memory 204 as the learned or the training model 230. The predictive model 1208 is then used to design customized rules 1210 for a particular user.

Accordingly, the intelligent clustering module 602 may break or divide each of the plurality of work-units into elements. The elements indicate the smallest meaningful units or relevant keywords. In an embodiment, the intelligent clustering module 602 fetches the user-activity data 226 and the application data 224 from the memory 204 and breaks the work-units 1204 into elements. The intelligent clustering module 602 may then cluster the work-units 1204 into clusters by applying the elements into the USLA 1206.

After a predefined density threshold is achieved for the clusters, the elements relation managing module 604 analyses the work-units 1204 by applying the predictive model 1208 in each cluster to form the rules. The predefined density threshold can be defined using any of clustering techniques as known in the art. The elements relation managing module 604 may associate the elements with a weightage based on number of interactions between various elements among all the work-units 1204 present in the cluster to form the rules 1210. In an example, frequently used elements are associated together based on a weightage to form rules. The weightage associated may be a reference numeral. Thus, the rules are weightage based associations between the elements. The rules may be saved in the rule database 218.

Referring to FIG. 12B, four work-units 1204 are broken into various elements. Each of work-units is a task performed related to and/or within an electronic device 102. In an example, work-unit 1204-1 indicates "User A invites User B to his wedding using email EA". The application data 224 indicates email application being used. The user-activity data 226 indicates various steps such as opening email application, entering recipient email ID, writing text, attaching wedding card, sending email, and closing the email application. The intelligent clustering module 602 may then break the work unit 1204-1 into elements of 'User A', 'Invite', 'User B', 'Email EA', and 'Wedding'. Thus, the work unit is not a single entity but rather a relation between various elements, such as applications 208, context, data, events, etc. Similarly, work-unit 1204-2 indicates "User B discusses about a trip to a location L1 with User A using chat application CA". The intelligent clustering module 602 may then break the work unit 1204-2 into elements of 'User B', 'Trip', 'Location L1', 'Chat CA', and 'User A'. In the same way, work-unit 1204-3 indicates "User A searches for wedding shoes using E-commerce application EC1 with". The intelligent clustering module 602 may then break the work unit 1204-3 into elements of 'User A', 'Shop', 'Wedding', 'Shoes', and 'E-commerce EC1'. The intelligent clustering module 602 may map the work units related to specific user. For example, the work units 1204 may be mapped to a user 'User A'. The intelligent clustering module 602 applies the work-units 1204 and the elements to the USLA 1206 to form the clusters C1, C2, and C3.

Based on the work-units 1204 and the elements extracted from the work-units 1204, data points are calculated. The data points consist of elements extracted from the work-units 1204. The data points are fed to the USLA 1206 which helps spot clustering which form the clusters C1, C2, and C3. Referring to FIG. 12B, plotted work units 1207 may include the clusters C1, C2 and C3 each of which identifies rules (rule 1, rule 2, and rule 3).

Assuming that an interaction between a user and the electronic device 102 may take place every day, work-units from the interaction may be generated on a daily basis. Until the user's usage pattern becomes settled, the training of a model is repeated for a certain period of time—e.g. a few weeks. After the usage pattern becomes settled and the personalized rules exceeding a predetermined number are established, retraining of the model takes place only when the data points calculated from the work-units are deviating vastly from the current clusters C1, C2 and C3, which save the resources for the training in the electronic device 102.

Referring to FIG. 12C, the elements relation managing module 604 analyses the clusters by applying the predictive model 1208 and associates the frequently used elements each other based on the weightage to form the rule 1210. As may be observed in FIG. 12C, the element 'User A' and the element 'Wedding' are frequently used and associated together 3 times. As such, a weightage of 3 is allocated to an association between element 'User A' and element 'Wedding'. Likewise, the element 'User A' and the element 'E-commerce EC1' are used only once. As such, a weightage of 1 is allocated to an association between element 'User A' and element 'E-commerce EC1'. Thus, the rules 1210 are personalized based on a user's personal interaction with the electronic device 102.

The rule managing module 606 manages a number of rules based on a pre-defined threshold count. The threshold count can be defined during the time of manufacturing the electronic device 102 or can be determined from the predictive model 1208. Once the threshold is reached, the rule managing module 606 may remove the least recently used rule.

Further, it would be understood that work units are generated constantly in the electronic device 102 based on user activity on the electronic device 102. However, such user activity starts repeating after a certain period of time, for example, after a few weeks, and therefore new work units formed will start falling into the clusters already formed. As such, the predictive model 1208 is trained to generate the pre-defined threshold count of rules. After initial training period, the predictive model 1208 is applied for inference. After the predictive model 1208 is applied for inference, the rule managing module 606 may handle the mapping of new work units based on the deviation from the current clusters and may trigger retraining of the existing predictive model 1208 with new observed data. Typically, the retraining of the existing predictive model 1208 is executed during idle times, for example, during night time, during charging, etc. The retraining of the existing predictive model 1208 is implemented using incremental learning technique (which is used for learning from continuous data arriving over time) with limited memory resources and without sacrificing model accuracy. Thus, the predictive model 1208 learns in a sequential manner and dynamically adapts locally to new patterns.

Now, the smart segregation module 504 segregates the data files among the rules designed by the smart rule designing module 502. To this end, the smart segregation module 504 analyzes content of the data file to extract a plurality of elements. The smart segregation module 504 maps the plurality of elements to one or more rules saved in the rule database 218. Upon transmitting the data files to the cloud-based storage systems 104 for storage, the cloud upload module 412 receives data identities associated with the data files from the cloud-based storage systems 104. The cloud upload module 412 creates a mapping of the data identities with the corresponding rules as preview information. The data identity includes thumbnails of the data files and location of the data file on the corresponding cloud-based storage system. The cloud upload module 412 stores the preview information in the mapping database 222.

Figure 13A:
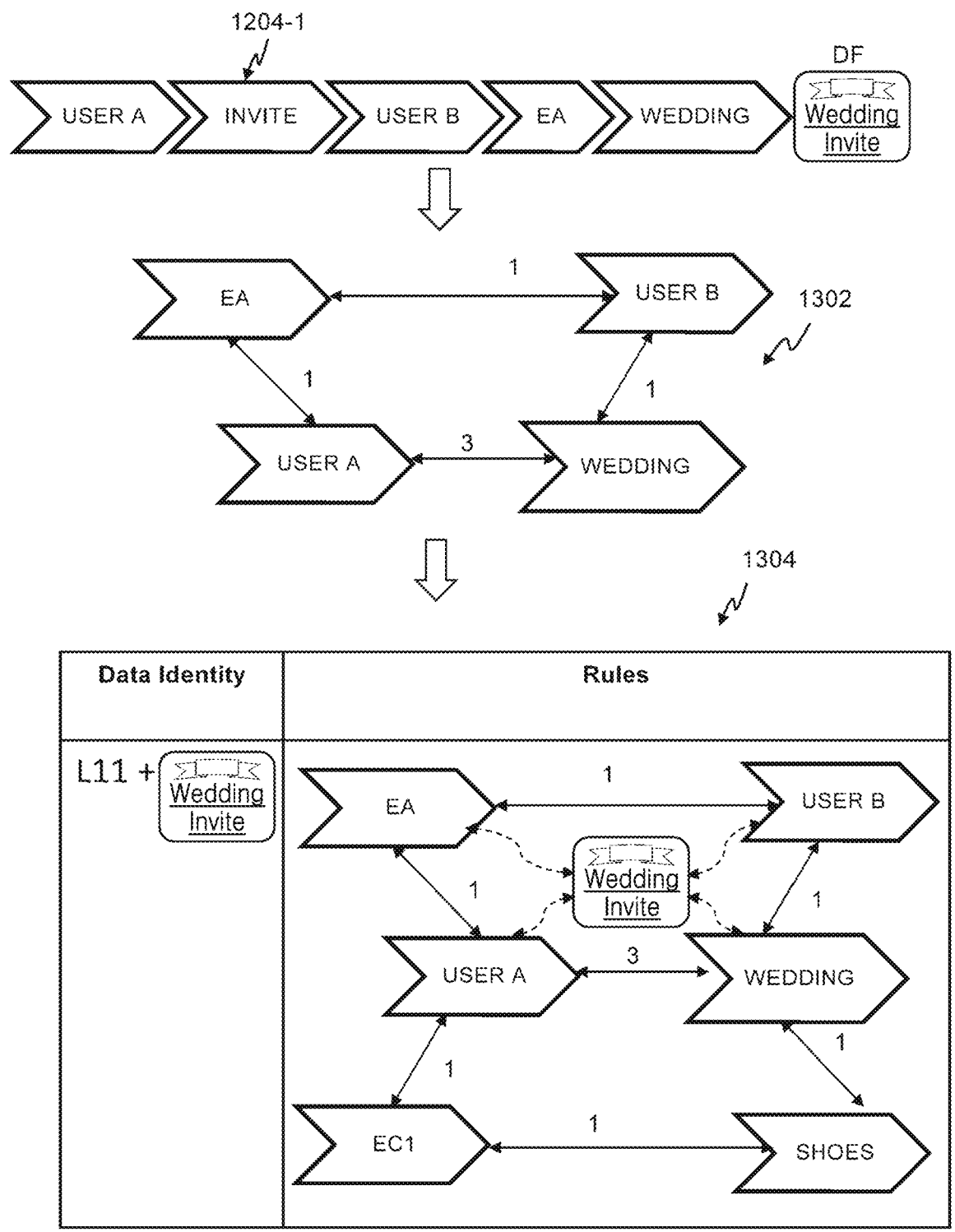
FIG. 13A and FIG. 13B illustrates example data flows for storing and searching data files on the plurality of cloud-based storage systems, according to an embodiment of the disclosure.
Figure 13B:
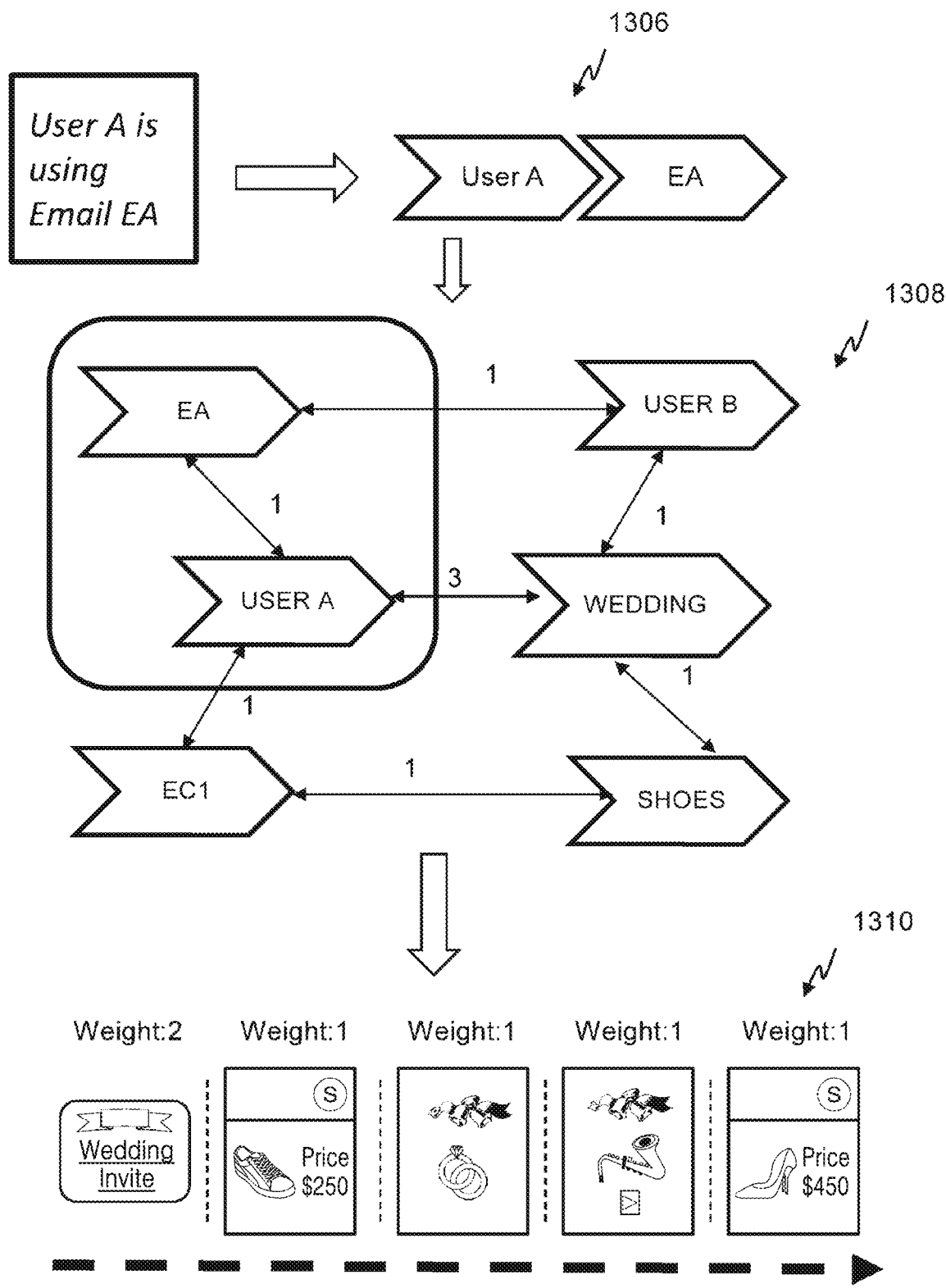

FIG. 13A and FIG. 13B illustrate example data flows for storing and searching data files on the plurality of cloud-based storage systems, according to embodiments of the disclosure.

Referring to FIGS. 12A-12C and FIG. 13A, data files (represented by rounded square) are selected by the smart sync module 302 in accordance with user-preferences data as described earlier. Prior to uploading the data files, the smart segregation module 504 analyses content of the data files and fetches relevant rules 1302 from the rule database 218. The smart segregation module 504 then groups the data files in accordance with the rules 1302. The cloud upload module 412 uploads the data files into corresponding cloud-based data storage systems 104. The cloud upload module 412 then receives the data identities comprising of the thumbnails of the data files and location of the data files (represented as L11). The cloud upload module 412 then creates a mapping 1304 between the data identities and the rules associated with the data files. The mapping is stored as preview information in the mapping database 222.

As may be gathered from FIG. 13A, the work-unit 1204-1 also includes a data file DF. Elements 'Email EA', 'User A', 'Wedding', and 'User B' are associated with, for example, the data file 'Wedding Invite.pdf'. The elements are mapped to rules 1302 indicative of weightage based associations between the elements. The data file 'Wedding Invite.pdf' is then stored in the CBSS 104 and data identity including location L11 and thumbnail are mapped to corresponding rules.

The mapping database 222 stores the mapping but does not store the actual data files. Thereafter, a user-selectable option is provided on all applications through which the data files are associated & uploaded onto the CBSS 104. The user-selectable option enables searching of one or more data files stored on the plurality of cloud-based storage systems 104. The user-selectable option may be presented in a form of floating icon.

The task detection module 506 predicts a work-unit which user is going to perform and then identify rules which will be relevant to the user and provides preview information of the data files corresponding to the identified rules. To this end, an input receiving unit may receive, within one of the applications 208 on the electronic device 102, a user-input indicative of searching one or more data files stored on the plurality of cloud-based storage systems 104. The task detection module 506 determines a current work-unit in response to the user-input. The task detection module 506 extracts a plurality of elements from the current work-unit, in a manner as described above. The smart segregation module 504 maps the plurality of elements to one or more rules stored in the memory 204. The task detection module 506 fetches preview information from the memory 204 corresponding to a set of data files stored on at least one of the plurality of cloud-based storage systems 104 based on the one or more rules. The task detection module 506 presents the preview information on the display unit 206.

Referring to FIG. 13B, User A is accessing his email with Email EA application. The current work-unit is determined as 'User A' accessing Email EA application' and elements 1306 are extracted from the current work-unit as 'User A' and 'Email EA'. Based on the elements 1306, the rules are fetched from the rule database 218. The elements are mapped with the one or more rules 1308 (represented by square). As may be gathered, elements 'User A' and 'Email EA' are mapped to one rule having a weightage of 1 associated between elements 'User A' and 'Email EA'. However, the elements 'User A' and 'Email EA' are mapped individually to other elements. Based on the rules, the preview information 1310 of data files are obtained and presented on the electronic device 102. The sequence of presenting the preview information 1310 of each of the data files is based on the weightage corresponding to the matching elements of the work-units. Thus, the rules are used to provide a user with personalized content, based on the prediction of relevance of data files.

In the example as described in the FIG. 13A, the data file 'Wedding Invite.pdf', is mapped to elements 'Email EA', 'User A', 'Wedding', and 'User B' with combined weightage association as 2. Similarly, an image data file 'shoe1.jpg' may be mapped to elements 'Wedding', 'E-commerce EC1', 'Shoes', and 'User B' with weightage association as 1. An image data file 'wedding.jpg' may mapped to elements 'Wedding', and 'User B' with weightage association as 1. An audio data file 'ani12.mp3' may be mapped to elements 'Wedding' and 'User A' with weightage association as 1. Another image data file 'shoe2.jpg' may be mapped with elements 'Wedding', 'E-commerce EC1', 'Shoes', and 'User B' with weightage association as 1. As such, the data files that are based on weightage corresponding to the matching elements of current work unit of the user are illustrated first. Thus, as may be gathered from FIG. 13B, preview information of data file 'Wedding Invite.pdf' is first in the order, followed by image data file 'shoe1.jpg', image data file 'wedding.jpg', audio data file 'ani12.mp3', and image data files 'shoe2.jpg'. Thus, personalized content is delivered or presented to the user based on the rules, which are based on the interaction of the user with the electronic device.

Figure 14:
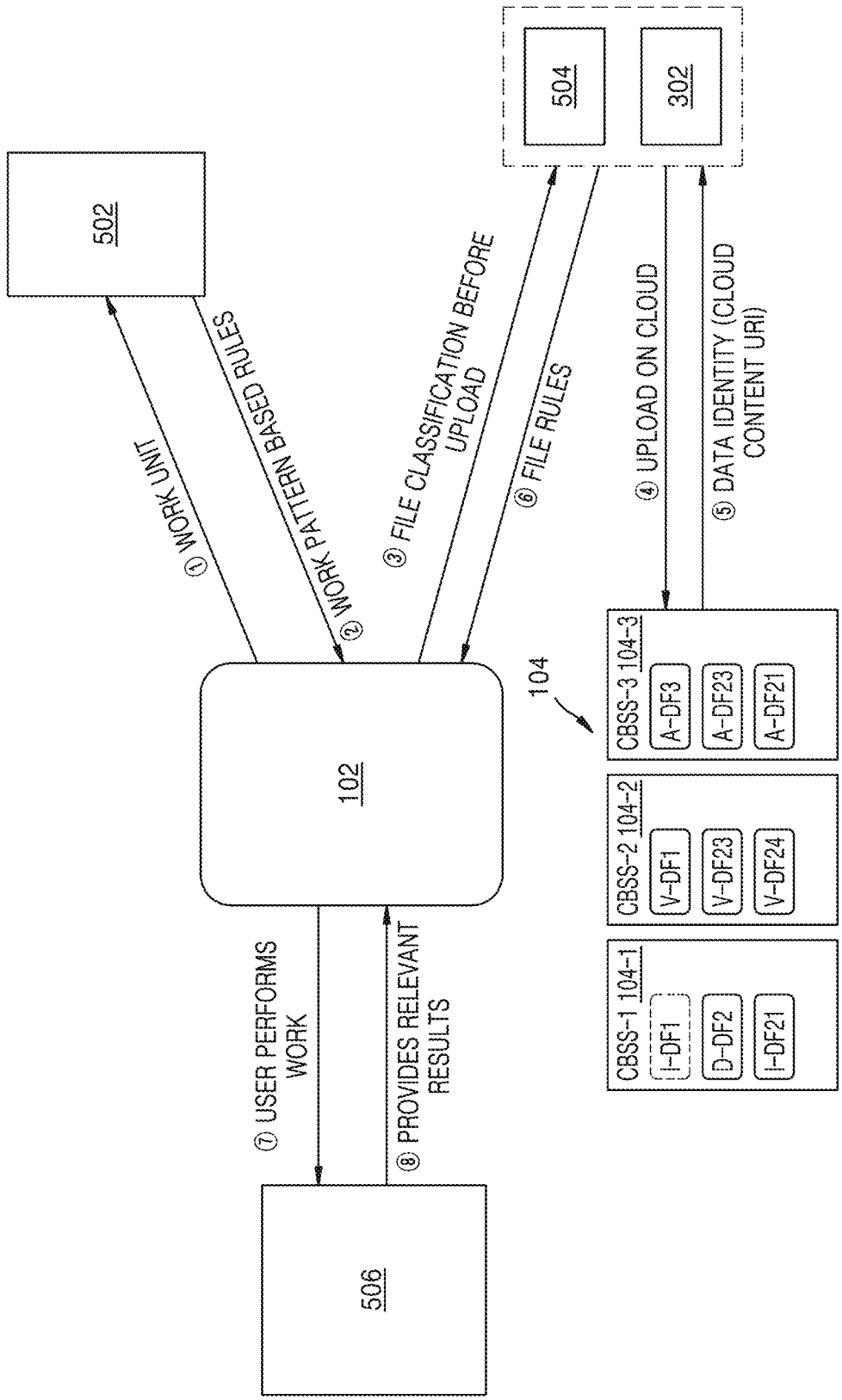
FIG. 14 illustrates an example data flow for storing and searching data files on the plurality of cloud-based storage systems, according to an embodiment of the disclosure.

FIG. 14 illustrates an example data flow for storing and searching data files on the plurality of cloud-based storage systems, according to an embodiment of the disclosure.

FIG. 14 illustrates an overall technical flow of the relevance prediction module 306. At step 1, work-units are monitored on the electronic device 102 by the smart rule designing module 502. At step 2, work pattern based rules are created by the smart rule designing module 502. At step 3, data files are classified in accordance with user preferences and the rules by the smart segregation module 504. At step 4, the data files from the electronic device 102 are uploaded onto the cloud-based storage systems 104 by the smart sync module 302. At step 5, data identities are provided to the smart segregation module 504 by the smart sync module 302. At step 6, the mapping of the data identities and the rules is stored in the link database 216 by the smart sync module 302. At step 7, user input on an application, available in the electronic device 102, is monitored by the task detection module 506 to determine current work unit. At step 8, preview information of a set of data files based on relevant rules are displayed on the display unit 206 of the electronic device 102 by the task detection module 506.

Figure 15:
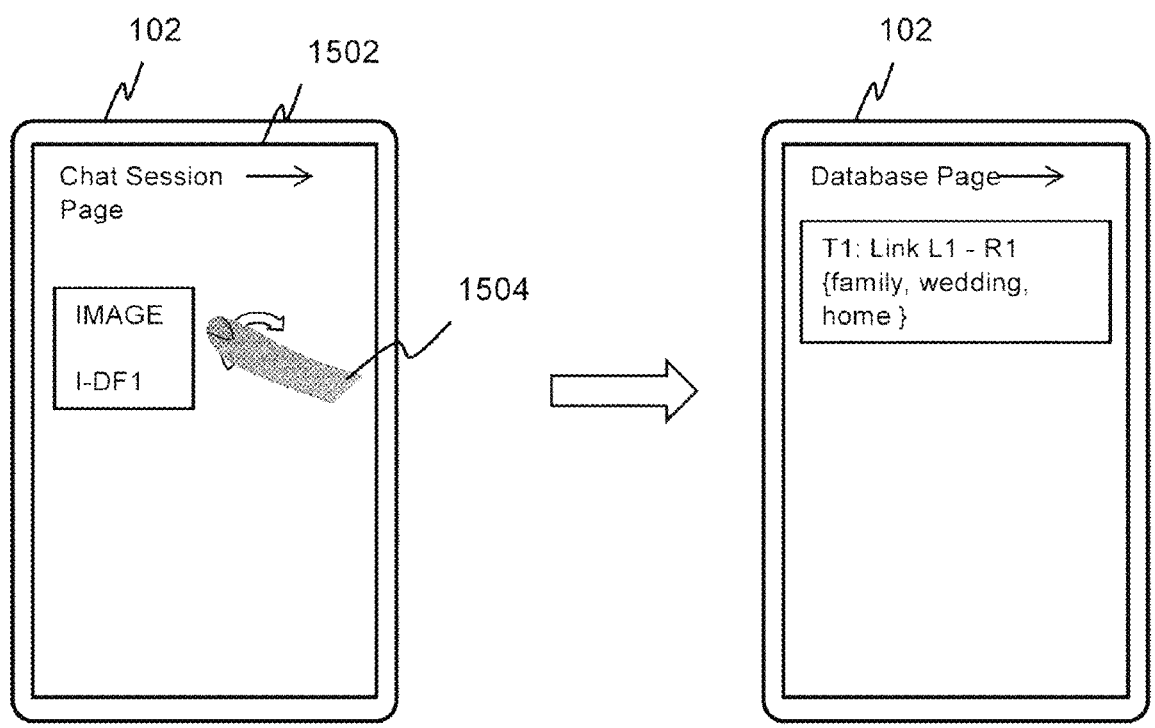
FIG. 15 illustrates an example data flow for storing and searching data files on the plurality of cloud-based storage systems, according to an embodiment of the disclosure.

FIG. 15 illustrates a first example manifestation of the disclosure.

Referring to FIG. 15, an image type data file I-DF1 is received on a chat application 1502 on the electronic device 102. A user-input 1504 is received to store the data file I-DF1 on the cloud-based storage system 104. Before uploading the file, the smart segregation module 504 analyses the content of the image type data file I-DF1 to extract elements as 'family, wedding, home', and finds the relevant rule R1 as a weightage based association between elements 'family, wedding, home'. Thereafter, the smart sync module 302 uploads the file onto the selected CBSS 104 and receives data identity including thumbnail T1 and location L1 of the uploaded data file I-DF1. The smart sync module 302 creates a mapping of the data identity and the rule R1 and saves in the rule database 218.

Figure 16:
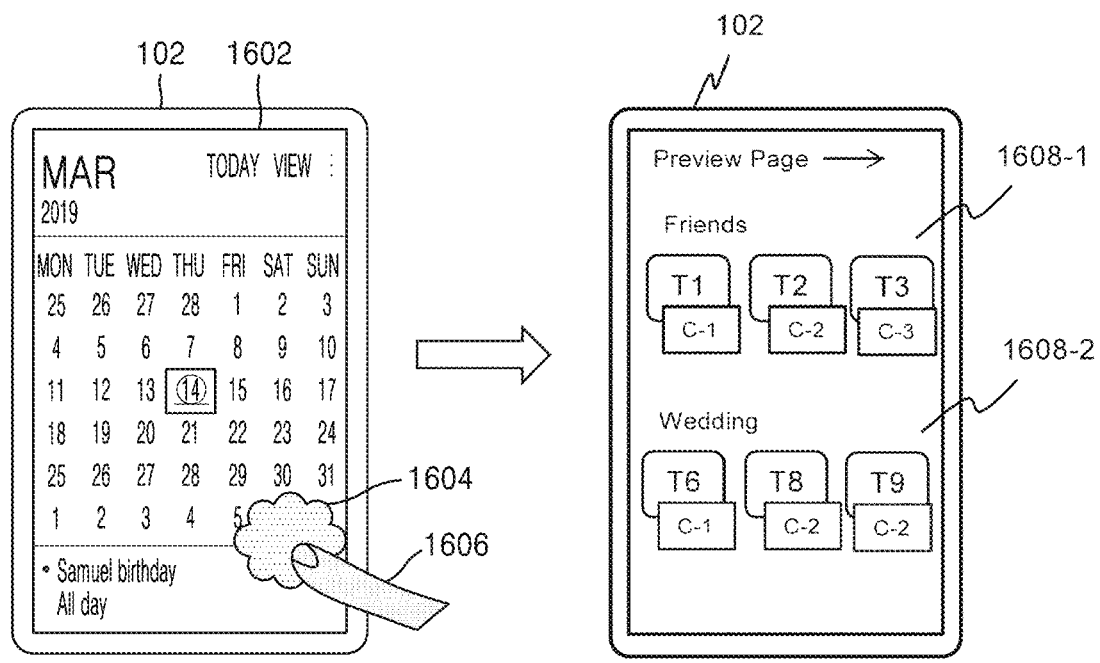
FIG. 16 illustrates example manifestations, according to an embodiment of the disclosure.

FIG. 16 illustrates a second example manifestation of the disclosure.

Referring to FIG. 16, a user accesses a calendar application 1602 which indicates an event as 'Samuel's birthday'. The smart sync module 302 provides a user-selectable option 1604 on the calendar application to enable the user to search relevant data files from the CBSS. A user-input 1606 is received on the calendar application 1602 indicative of selecting the user-selectable option 1604. The task detection module 506 determines work-unit as 'show relevant files related to the event' in response to the user-input. The task detection module 506 extracts elements 'friends, wedding' and determines or identifies relevant predetermined rules from the rule database 218. Based on the identified relevant predetermined rules, the task detection module 506 fetches the preview information of one or more data files based on the mapping between the rules and the preview information in the mapping database 222. Thereafter, the task detection module 506 displays the preview information of the one or more data files on the display unit 206 of the electronic device 102. The preview information includes thumbnails corresponding to the data files (T1, T2, T3, etc.), the locations of the data files (C-1, C-2, C-3), and mapped rules pertaining to the elements 'friends, wedding'. For the sake of brevity, preview information of data files 1608-1 and 1608-2 mapped to rules corresponding to element 'friends' and element 'wedding', respectively, are illustrated.

Figure 17:
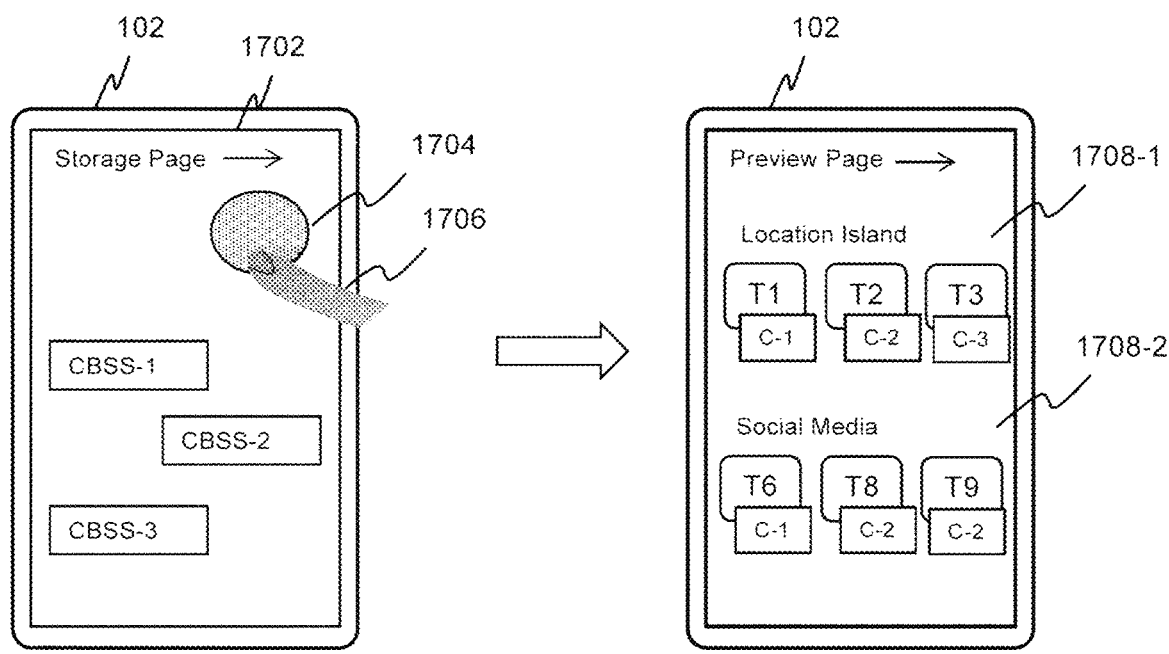
FIG. 17 illustrates example manifestations, according to an embodiment of the disclosure.

FIG. 17 illustrates a third example manifestation of the disclosure.

Referring to FIG. 17, a user accesses a storage page in settings application 1702, which indicates list of cloud-based systems. The smart sync module 302 provides a user-selectable option 1704 on the settings application to enable the user search relevant data files from the CBSS. A user-input 1706 is received on the application to search relevant files based on rules. The task detection module 506 determines work-unit as 'show files related to the rules'. The task detection module 506 determines the preview information of one or more data files based on the mapping between the rules and the preview information in the mapping database 222. Thereafter, the task detection module 506 displays preview information of the data files stored on the CBSS 104 on the display unit 206 of the electronic device 102. The preview information includes thumbnails corresponding to the data files (T1, T2, T3, etc.), the locations of the data files (C-1, C-2, C-3), and mapped rules pertaining to the elements 'location island, social media'. For the sake of brevity, preview information of data files 1708-1 and 1708-2 mapped to rules corresponding to element 'location island' and element 'social media', respectively, are illustrated.

Figure 18:
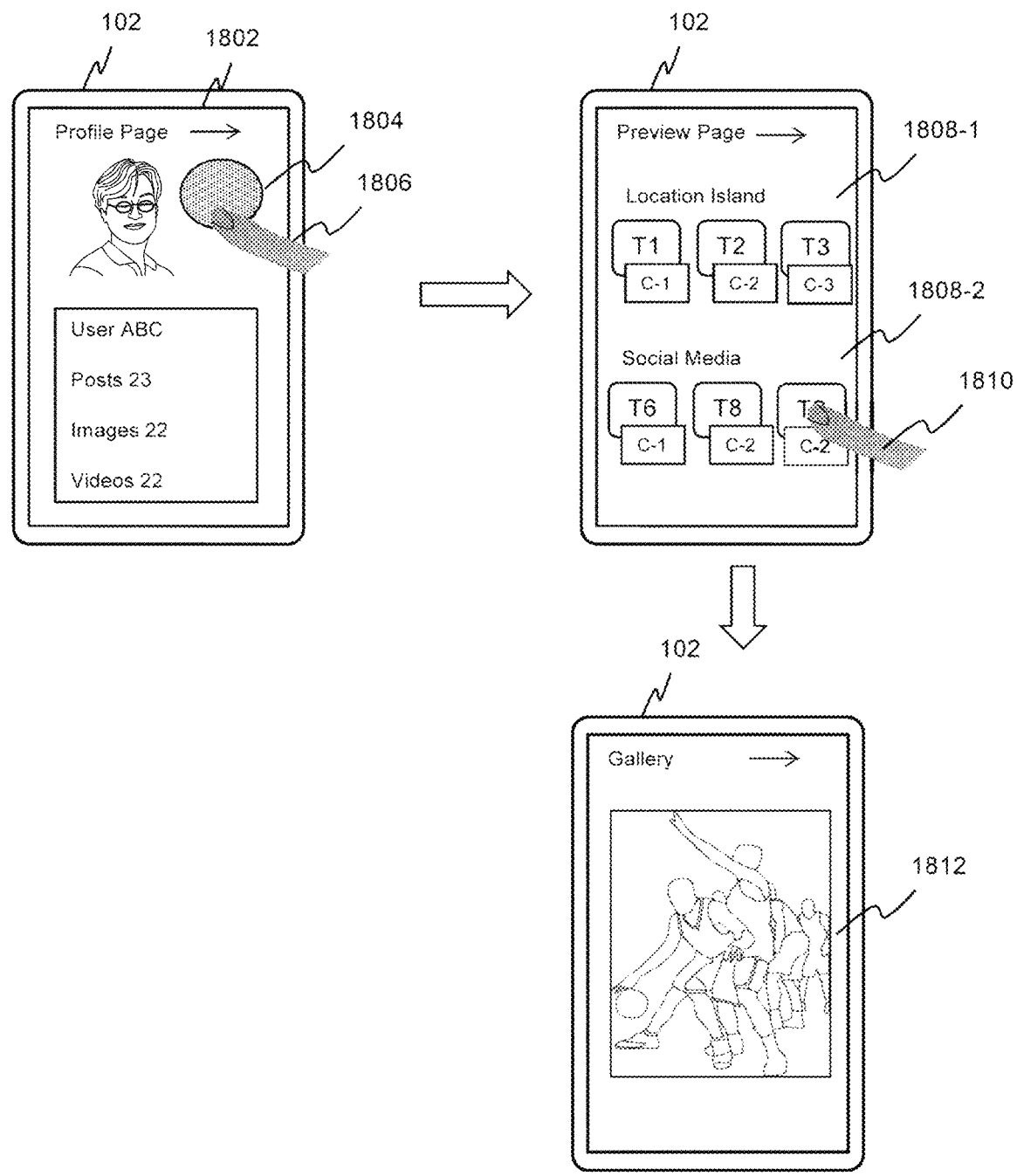
FIG. 18 illustrates example manifestations, according to an embodiment of the disclosure.

FIG. 18 illustrates a third example manifestation of the disclosure.

Referring to FIG. 18, a user accesses a profile page of a user ABC on a social media application 1802. The smart sync module 302 provides a user-selectable option 1804 on the social media application 1802 to enable the user to search relevant data files from the CBSS. A user-input 1806 is received on the application indicative of selecting the user-selectable option 1804. The task detection module 506 determines current work-unit as 'show relevant files related to the user ABC'. The task detection module 506 determines or identifies relevant predetermined rules based on the elements of the work-unit from the rule database 218. Based on the identified relevant predetermined rules, the task detection module 506 fetches the preview information of one or more data files based on the mapping between the rules and the preview information in the link database 216. Thereafter, the task detection module 506 displays preview information of the set of data files stored on the CBSS 104 on the display unit 206 of the electronic device 102. The preview information includes thumbnails corresponding to the data files (T1, T2, T3, etc.), the locations of the data files (C-1, C-2, C-3), and mapped rules pertaining to the elements 'location island, social media'. For the sake of brevity, preview information of data files 1808-1 & 1808-2 mapped with rules corresponding to element 'location island' and element 'social media', respectively, are illustrated.

Thereafter, a user-input 1810 is received on the preview information indicative of selecting a data file. In response, the task detection module 506 fetches the corresponding data file 1812 from the corresponding CBSS based on the data identity and displays the data file on the display unit of the electronic device 102.

Figure 19:
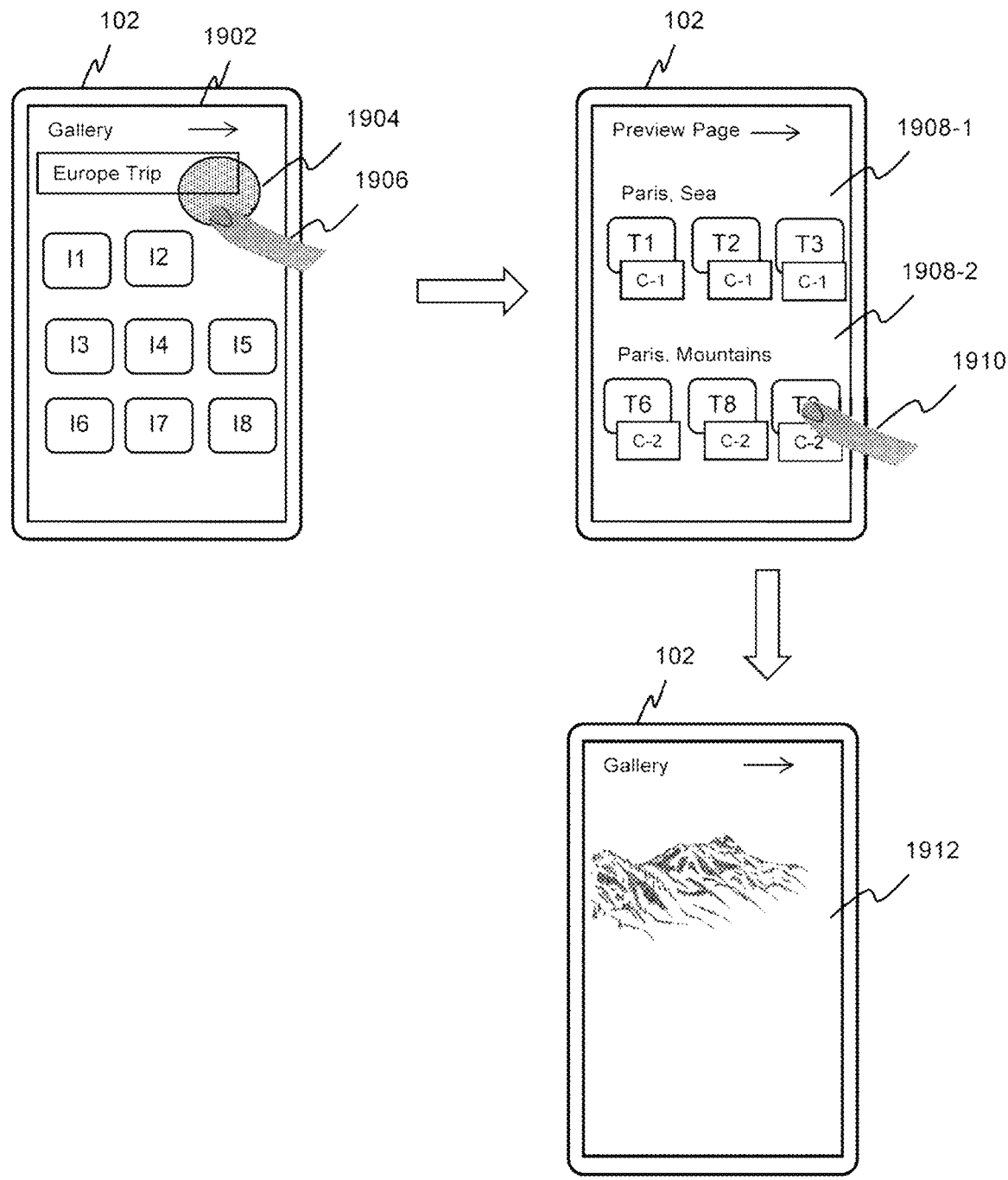
FIG. 19 illustrates example manifestations, according to an embodiment of the disclosure.

FIG. 19 illustrates a fourth example manifestation of the disclosure.

Referring to FIG. 19, a user accesses an album related to Europe trip in a gallery application 1902. The smart sync module 302 provides a user-selectable option 1904 on the gallery application 1902 to enable the user to search relevant data files from the CBSS. A user-input 1906 is received on the application indicative of selecting the user-selectable option 1904. The task detection module 506 determines current work-unit as 'show files related to Europe trip'. The task detection module 506 determines or identifies relevant predetermined rules based on the elements extracted from the current work-unit from the rule database 218. Based on the identified relevant predetermined rules, the task detection module 506 fetches the data identities of one or more data files based on the mapping between the rules and the data identities in the mapping database 222. Thereafter, the task detection module 506 displays preview information of the set of data files stored on the CBSS 104 on the display unit 206 of the electronic device 102. The preview information includes thumbnails corresponding to the data files (T1, T2, T3, etc.), the locations of the data files (C-1, C-2, C-3), and mapped rules pertaining to the elements 'Paris, sea, mountains'. For the sake of brevity, preview information of data files 1908-1 and 1908-2 mapped to rules corresponding to elements 'Paris, sea' and elements 'Paris, mountains', respectively, are illustrated.

Thereafter, a user-input 1910 is received on the preview information indicative of selecting a data file. In response, the task detection module 506 fetches the corresponding data file 1912 from the corresponding CBSS based on the data identity and displays the data file on the display unit 206 of the electronic device 102.

Generally, systems or methods of organizing, managing and recommending contents in various devices, such as a mobile phone, in communication with cloud-based storage systems, files are directly uploaded into the cloud-based storage system without any consideration of user's preference. Accordingly, multiple copies of same files are created on the cloud-based storage systems. Similarly, a retrieval of files necessitates manual searching of files on all the cloud-based storage systems without any consideration of user's requirement in current situation. By failing to consider such user's preferences and requirements in current situation, the systems may fail to save resources on both the cloud-based storage systems and the devices, leading to poor user-experience. Further, files once stored may be sorted on the basis of content type of file type, and the retrieval of files is neither context specific nor user-specific.

However, according to the embodiments of the disclosure, the uploading of files to the cloud-based storage systems and retrieval of files from the cloud-based storage systems is based on user's preference, user's requirement in current situation, and learned or predicted patterns. Accordingly, the file is mapped to the predicted future usefulness of file for a particular user while uploading the file onto the cloud-based storage systems. In addition, only preview information (for example, thumbnails) is generated & stored in the devices. As such, the files are readily available at all times. In addition, the files are retrieved as per user's requirement in current situation, and learned or predicted patterns. Therefore, retrieved files vary across different users. This leads to personalized results while performing similar tasks of the devices. Further, resources of cloud-based storage systems and the devices are optimized or performance of resources is improved leading to enhanced user-experience.

FIG. 20 illustrates a flow diagram of a method 2000 for storing data files on at least one cloud-based storage system, according to an embodiment of the disclosure.

Referring to FIG. 20, the method 2000 may be implemented by the electronic device 102 using components thereof, as described above. Further, for the sake of brevity, details of the disclosure that are explained in details in the description of FIGS. 1 to 19 are not explained in detail in the description of FIG. 20.

At block 2002, the method includes detecting an event on the electronic device 102 indicative of storing at least one data file on a cloud-based storage system. For example, the processor 202 detects an event on the electronic device 102 indicative of storing at least one data file on the cloud-based storage system 104.

At block 2004, the method includes analyzing a content of the at least one data file in response to detecting the event to extract a plurality of elements. For example, the processor 202 analyses the content of the at least one data file in response to detecting the event to extract the plurality of elements.

At block 2006, the method includes mapping the plurality of elements with one or more rules stored in a memory of the electronic device. The one or more rules are predetermined weightage based associations between the plurality of elements. For example, the processor 202 maps the plurality of elements to one or more rules stored in a memory 204 of the electronic device 102.

At block 2008, the method includes selecting at least one cloud-based storage system for storing the at least one data file. The selection of the at least one cloud-based storage system is based on user-preference data stored in the memory. For example, the processor 202 selects at least one cloud-based storage system from the plurality of cloud-based storage systems 104 for storing the at least one data file.

At block 2010, the method includes storing information corresponding to the at least one data file in the memory upon storing the at least one data file onto the at least one selected cloud-based storage system for searching the at least one data file. The information includes preview information corresponding to the at least one data file and the one or more rules. For example, the processor 202 stores the preview information upon storing the data file.

Further, the method 2000 includes obtaining the predefined cloud-configuration settings from the at least one selected cloud-based storage. The method 2000 includes transmitting the at least one data file for storing onto the at least one selected cloud-based storage system. The method 2000 includes receiving the data identity from the at least one selected cloud-based storage system, the data identity comprising thumbnail of the at least one data file and location of the at least one file stored on the at least one selected cloud-based storage system. The method 2000 includes creating and storing the mapping between the data identity and the one or more rules in the memory.

Further, the method 2000 includes detecting a request from one or more of the plurality of cloud-based storage systems to access the at least one data file for storing. The method 2000 includes preventing a transmission of the at least one data file to the one or more of the plurality of cloud-based storage systems in response to the detecting the request.

Further, the method 2000 includes identifying at least one duplicate copy of the data file stored in one or more of the plurality of the cloud-based storage systems including the at least one selected cloud-based storage system, the one or more data files including the at least one data file. The method 2000 includes deleting the at least one duplicate copy of the data file based on the user-preference data.

FIG. 21 illustrates a flow diagram of searching data files on the plurality of cloud-based storage systems, according to an embodiment of the disclosure.

Referring to FIG. 21, the method 2100 may be implemented by the electronic device 102 using components thereof, as described above. Further, for the sake of brevity, details of the disclosure that are explained in details in the description of FIGS. 1 through 19 are not explained in detail in the description of FIG. 21.

At block 2102, the method includes receiving in an application on the electronic device 102, a user-input indicative of searching one or more data files stored on the plurality of cloud-based storage systems. For example, the processor 202 receives a user-input within the application indicative of searching one or more data files stored on the plurality of cloud-based storage systems 104.

At block 2104, the method includes determining a current work-unit in response to the user-input. For example, the processor 202 determines the current work-unit in response to the user-input.

At block 2106, the method includes extracting a plurality of elements from the current work-unit. For example, the processor 202 extracts the plurality of elements from the current work-unit.

At block 2108, the method includes mapping the plurality of elements with one or more rules stored in a memory of the electronic device. The one or more rules are predetermined maximum weightage based associations between the plurality of elements. For example, the processor 202 maps the plurality of elements to one or more rules stored in the memory 204.

At block 2110, the method includes fetching, from the memory, preview information corresponding to a set of data files stored on at least one of the plurality of cloud-based storage systems based on the one or more rules. For example, the processor 202 fetches the preview information from the memory 204.

At block 2112, the method includes presenting the preview information on the electronic device. For example, the processor 202 presents the preview information on the electronic device 102.

Further, the method 2100 includes receiving, on the preview information, a further user-input indicative of selecting a data file from the set of data files. The method includes obtaining the data file from at least one of the plurality of cloud-based storage systems based on the preview information corresponding to the data file. The method includes presenting the data file on the electronic device.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of storing data files on at least one cloud-based storage in communication with an electronic device, the method comprising:
    detecting, on the electronic device, an event indicative of storing at least one data file on a cloud-based storage;
    analyzing the at least one data file in response to detecting the event to extract a plurality of elements from the at least one data file;
    mapping the plurality of elements to one or more rules stored in a memory, wherein the one or more rules are predetermined weightage based associations between the plurality of elements, wherein the predetermined weightage based associations are a number of interactions between the plurality of elements;
    selecting, among a plurality of cloud-based storages, at least one cloud-based storage for storing the at least one data file;
    obtaining predefined cloud-configuration settings pertaining to the selected at least one cloud-based storage from the selected at least one cloud-based storage;
    transmitting the at least one data file to the selected at least one cloud-based storage based on the predefined cloud-configuration settings;
    receiving, from the at least one cloud-based storage, data identities associated with the at least one data file, wherein the data identities includes thumbnails of the at least one data file and location of the at least one data file on the at least one cloud-based storage;
    generating a mapping of the data identities with the one or more rules as preview information of the at least one data file;
    storing the preview information in a mapping database of the electronic device;
    detecting a request from one or more of the plurality of cloud-based storages other than the selected at least one cloud-based storage to access the at least one data file for storing; and
    preventing a transmission of the at least one data file to the one or more of the plurality of cloud-based storages in response to the detecting the request.

2. The method of claim 1, wherein the event is at least one of:
    creating and storing the at least one data file in at least one of the memory or a storage medium; or
    storing the at least one data file from at least one of the memory or the storage medium onto the plurality of cloud-based storages, the at least one data file being associated with one or more applications on the electronic device.

3. The method of claim 1, wherein the at least one cloud-based storage is selected based on user-preference data stored in the memory.

4. The method of claim 1, wherein the one or more rules are identified across a plurality of work-units detected prior to the event, information pertaining to one or more applications on the electronic device, and user-activity on the electronic device.

5. The method of claim 1, further comprising:
    identifying at least one duplicate of the at least one data file stored in one or more of the plurality of the cloud-based storages including the selected at least one cloud-based storage; and
    deleting the at least one duplicate of the at least one data file based on user-preference data.

6. An electronic device for storing data files on at least one cloud-based storage, the electronic device comprising:
    a memory; and
    a processor coupled to the memory and configured to execute computer readable instructions to:
        detect an event indicative of storing at least one data file on a cloud-based storage,
        analyze the at least one data file in response to the detection of the event to extract a plurality of elements from the at least one data file,
        map the plurality of elements to one or more rules stored in the memory, wherein the one or more rules are predetermined weightage based associations between the plurality of elements, wherein the predetermined weightage based associations are a number of interactions between the plurality of elements,
        select, among a plurality of cloud-based storages, at least one cloud-based storage for storing the at least one data file,
        obtain predefined cloud-configuration settings pertaining to the selected at least one cloud-based storage from the selected at least one cloud-based storage,
        transmit the at least one data file to the selected at least one cloud-based storage based on the predefined cloud-configuration settings,
        receive, from the at least one cloud-based storage, data identities associated with the at least one data file, wherein the data identities includes thumbnails of the at least one data file and location of the at least one data file on the at least one cloud-based storage, generate a mapping of the data identities with the one or more rules as preview information of the at least one data file, store the preview information in a mapping database of the electronic device, detect a request from one or more of the plurality of cloud-based storages other than the selected at least one cloud-based storage to access the at least one data file for storing, and prevent a transmission of the at least one data file to the one or more of the plurality of cloud-based storages in response to the detecting the request.

7. The electronic device of claim 6, wherein the event is at least one of:

creating and storing the at least one data file in at least one of the memory or a storage medium; or storing the at least one data file from at least one of the memory or the storage medium onto the plurality of cloud-based storages, the at least one data file being associated with one or more applications on the electronic device.

8. The electronic device of claim 6, wherein the selecting of the at least one cloud-based storage comprises selecting the at least one cloud-based storage based on user-preference data stored in the memory.

9. The electronic device of claim 6, wherein:

the one or more rules are identified across a plurality of work-units detected prior to the event, information pertaining to one or more applications on the electronic device, and user-activity on the electronic device.

10. The electronic device of claim 6, wherein the processor is configured to execute the computer readable instructions to:

identify at least one duplicate of the at least one data file stored in one or more of the plurality of the cloud-based storages including the selected at least one cloud-based storage; and delete the at least one duplicate of the at least one data file based on user-preference data.

11. A non-transitory computer readable storage medium embodying a computer program for operating an electronic device including a memory and a processor, the computer program comprising instructions that, when executed by the processor, cause the processor to:

detect, on the electronic device, an event indicative of storing at least one data file on a cloud-based storage;

analyze the at least one data file in response to detecting the event to extract a plurality of elements from the at least one data file;

map the plurality of elements to one or more rules stored in the memory, wherein the one or more rules are predetermined weightage based associations between the plurality of elements, wherein the predetermined weightage based associations are a number of interactions between the plurality of elements;

select, among a plurality of cloud-based storages, at least one cloud-based storage for storing the at least one data file;

obtain predefined cloud-configuration settings pertaining to the selected at least one cloud-based storage from the selected at least one cloud-based storage;

transmit the at least one data file to the selected at least one cloud-based storage based on the predefined cloud-configuration settings;

receive, from the at least one cloud-based storage, data identities associated with the at least one data file, wherein the data identities includes thumbnails of the at least one data file and location of the at least one data file on the at least one cloud-based storage;

generate a mapping of the data identities with the one or more rules as preview information of the at least one data file;

store the preview information in a mapping database of the electronic device;

detect a request from one or more of the plurality of cloud-based storages other than the selected at least one cloud-based storage to access the at least one data file for storing; and prevent a transmission of the at least one data file to the one or more of the plurality of cloud-based storages in response to the detecting the request.

* * * * *